(12) United States Patent
Killian et al.

(10) Patent No.: US 7,575,177 B2
(45) Date of Patent: Aug. 18, 2009

(54) DUAL USE PAYMENT DEVICE

(75) Inventors: Patrick Killian, Cottleville, MO (US); Sandeep Malhotra, Ballwin, MO (US); Andrew D. Campbell, Ash (GB); Shoon Wong, St. Charles, MO (US); Dana Lorberg, St. Louis, MO (US)

(73) Assignee: Mastercard International, Inc., Purchase, NY (US)

( * ) Notice: Subject to any disclaimer, the term of this patent is extended or adjusted under 35 U.S.C. 154(b) by 0 days.

(21) Appl. No.: 11/964,425

(22) Filed: Dec. 26, 2007

(65) Prior Publication Data

US 2009/0090783 A1   Apr. 9, 2009

Related U.S. Application Data

(60) Provisional application No. 60/977,260, filed on Oct. 3, 2007.

(51) Int. Cl.
*G06K 7/10* (2006.01)
(52) U.S. Cl. ............. 235/492; 235/375; 235/380; 705/39; 705/78
(58) Field of Classification Search .......... 235/492, 235/375, 380; 705/39, 78
See application file for complete search history.

(56) References Cited

U.S. PATENT DOCUMENTS

| 6,535,726 | B1 * | 3/2003 | Johnson ............... 455/406 |
| 6,934,689 | B1 * | 8/2005 | Ritter et al. ............. 705/17 |
| 7,058,611 | B2 | 6/2006 | Kranzley et al. |
| 7,194,422 | B1 * | 3/2007 | St. John Killick .......... 705/14 |
| 2002/0083011 | A1 * | 6/2002 | Kobayashi ............. 705/64 |
| 2003/0004808 | A1 * | 1/2003 | Elhaoussine et al. ........ 705/14 |
| 2007/0069013 | A1 * | 3/2007 | Seifert et al. ............ 235/383 |
| 2007/0152035 | A1 * | 7/2007 | Adams et al. ............ 235/380 |
| 2008/0011833 | A1 * | 1/2008 | Saarisalo ............... 235/382 |
| 2008/0099552 | A1 | 5/2008 | Grillion |
| 2008/0208681 | A1 * | 8/2008 | Hammad et al. ........... 705/13 |
| 2008/0208762 | A1 * | 8/2008 | Arthur et al. ............. 705/79 |
| 2008/0255947 | A1 * | 10/2008 | Friedman .............. 705/14 |

FOREIGN PATENT DOCUMENTS

EP    1 372 089 A1    12/2003

\* cited by examiner

*Primary Examiner*—Allyson N Trail
(74) *Attorney, Agent, or Firm*—Buckley, Maschoff & Talwalkar LLC

(57) ABSTRACT

A mobile device includes an antenna and at least one control device coupled to the antenna. The at least one control device is selectively operable in a first mode and in a second mode. In the first mode, the at least one control device transmits a payment card account number via the antenna to a point of sale terminal. In the second mode, the at least one control device transmits a message to the point of sale terminal via the antenna to request that the point of sale terminal download transaction information to the mobile device.

16 Claims, 17 Drawing Sheets

DUAL USE PAYMENT DEVICE

CROSS-REFERENCE TO RELATED APPLICATION

This application claims the benefit of provisional patent application Ser. No. 60/977,260, filed Oct. 3, 2007, which application is incorporated herein by reference.

BACKGROUND

Embodiments disclosed herein relate to payment systems. In particular, some embodiments relate to methods, apparatus, systems, means and computer program products for implementing a payment system on the basis of a payment card system.

Payment card systems are in widespread use. A prominent payment card system is operated by the assignee hereof, MasterCard International Incorporated, and by its member financial institutions. FIG. 1 schematically illustrates a typical transaction, as carried out in a payment system 100. To initiate the transaction, a customer (not shown) visits a retail store (not shown) operated by a merchant, selects goods (not shown) that he/she wishes to purchase, carries the goods to the merchant's point of sale terminal 104, and presents his/her payment card 102 to the point of sale terminal 104. The point of sale terminal 104 reads the customer's payment card account number from the payment card 102, and then sends an authorization request to an acquirer financial institution (FI) 106 with which the merchant has a relationship. The authorization request includes the payment card account number and the amount of the transaction, among other information. The authorization request is routed via a payment card system 108 (which may be, for example, the well-known Banknet system operated by the assignee hereof) to the issuer financial institution 110 that issued the customer's payment card 102. Arrows 112, 114 and 116 trace the path of the authorization request from the POS terminal 104 to the issuer 110.

Assuming that all is in order, the issuer FI 110 transmits a favorable authorization response to the point of sale terminal 104 through the payment card system 108 and via the acquirer FI 106. (The path of the authorization response from the issuer FI 110 to the POS terminal 104 is traced by arrows 118, 120, 122.) The transaction at the point of sale terminal 104 is then completed and the customer leaves the store with the goods. A subsequent clearing transaction initiated by the merchant results in a transfer of the transaction amount from the customer's payment card account 124 to an account that belongs to the merchant. The customer's payment card account 124 may be, for example, either a debit card account or a credit card account. In the former case, the clearing transaction results in the funds being debited directly from the account 124. In the latter case, the clearing transaction results in a charge being posted against the account 124, and the charge subsequently appears on the customer's monthly credit card statement.

The foregoing description of the typical transaction may be considered to be somewhat simplified in some respects. For example, a so-called merchant processing system (not shown) may be interposed between the POS terminal and the acquirer FI. As is familiar to those who are skilled in the art, a merchant processing system may be operated by or on behalf of the merchant to form part of the communications path between the acquirer FI and a considerable number of POS terminals operated by the merchant. It is also often the case that a third party transaction processing service may operate to handle payment card transactions on behalf of the acquirer and on behalf of a large number of other like financial institutions.

The present inventors have now recognized that an existing facility of a payment card system, referred to as a "payment transaction", may be utilized to provide more convenient and flexible handling of purchases of goods and other exchanges of value. Among other advantages, the transactions described herein may be conducted such that the customer need not disclose his/her payment card account number to the merchant. This may, in at least some circumstances, enhance the security of the customer's payment card account and lessen the possibilities for misappropriation of the payment card account number.

The novel use of payment transactions disclosed herein may also cause transactions to be conducted in such a manner that the customer may be made fully aware of all transaction details before the customer initiates the payment transaction. This may help to protect the customer from unintentionally authorizing erroneous or fraudulent payment card transactions, and may reduce the number of occasions in which transactions need to be reversed.

From the merchant's point of view, transaction techniques disclosed herein may save the merchant from having to enter into a relationship with an acquirer financial institution. This may be particularly advantageous for very small merchants or for merchants who do not have fixed places of business. Moreover, elimination of the "acquirer" function, as proposed herein, may result in savings in bank fees charged to merchants.

The present inventors have also recognized that the novel transaction techniques proposed herein present opportunities for novel value-added services which may be provided to customers, merchants and/or financial institutions.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment card system payment transaction initiated from a customer's device (such as a mobile telephone) is utilized to consummate a purchase of goods or services. In some embodiments, the transaction information, such as an amount due for the purchase, and a code that identifies the merchant, may be entered into or transmitted to the customer's device. In the former case, the transaction information may be displayed by a merchant's device (e.g., a POS terminal) to be read by the customer and manually entered by the customer into the customer's device. The customer may operate his/her device to initiate a request for a payment transaction via the issuer of the customer's payment card account. The request may direct the customer's issuer to implement a transfer of funds from the customer's payment card account to the merchant's payment card account. The vehicle for the funds transfer may be a conventional payment transaction of the type now supported by at least one payment card system. The issuer of the customer's payment card account may cause the payment transaction to be routed via the payment card system to the issuer of the merchant's payment card account to be credited to the merchant's payment card account. Upon authorization/completion of the payment transaction, the merchant's issuer may confirm to the merchant that the funds transfer has occurred (or is assured to occur subsequently during conventional clearing operations), and in response to receiving the confirmation, the merchant may transfer ownership of the goods to the customer, or may accept the confirmation as payment for services rendered or to be rendered to the customer.

In this arrangement, the payment card transaction enters the system via a device operated by the customer and is initiated for routing from the customer's issuing financial institution, rather than originating from the merchant's POS terminal and the acquiring financial institution. Certain advantages of the rearranged and novel transaction flow described herein have been alluded to above and will be discussed in more detail below, along with other advantages and advantageous features.

In other aspects, a payment services provider computer may facilitate and/or relay communications between the merchant's device and the customer's device, and/or between the customer's device and the customer's issuer, and/or between the merchant's issuer and the merchant. In some embodiments, the payment services provider computer may be operated by the payment card organization (e.g., the assignee hereof) that routes payment transactions from customer issuers to merchant issuers and also routes purchase transactions from acquirers to issuers.

Figure 2:
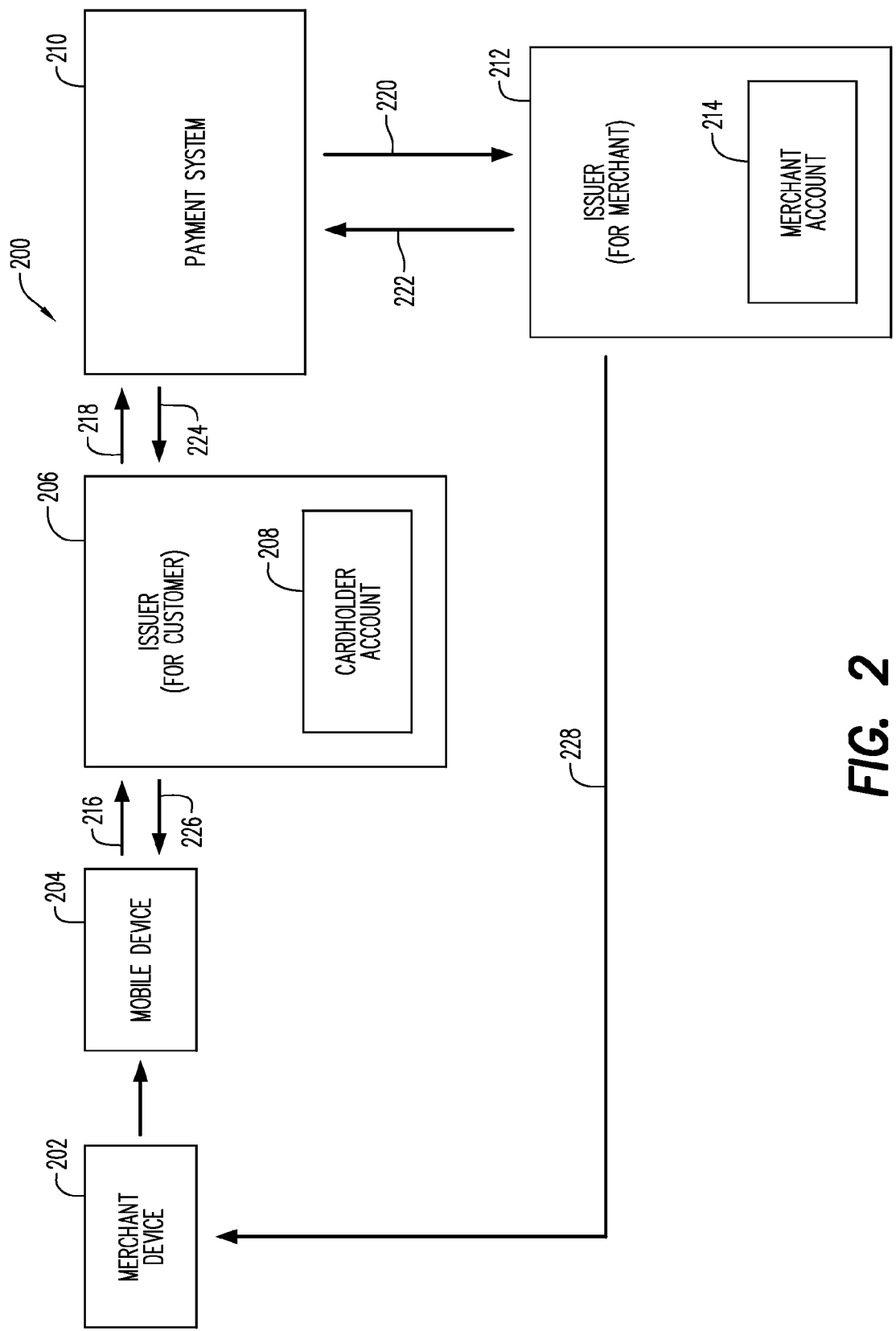
FIG. 2 is a block diagram that illustrates a transaction-handling system in accordance with aspects of the present invention.

FIG. 2 is a block diagram that illustrates a transaction process in accordance with aspects of the present invention. The various components shown in FIG. 2, and discussed below, may be a subset of a larger system, indicated generally by reference numeral 200, for facilitating payments to merchants via credit cards, debit cards and the like. In the example embodiment illustrated in FIG. 2, only components of system 200 that operate with respect to a single transaction are shown.

The system 200 includes a merchant device 202, which may for example be a POS terminal or a suitably programmed mobile telephone or PDA (personal digital assistant) with communication capabilities. (The latter two possible embodiments of the merchant device may for example be particularly appropriate for merchants who operate without a fixed place of business. Examples of such merchants may be flea market sellers, artisans and crafters who sell their handiwork at craft fairs, itinerant merchants or merchants in third world marketplaces. For many merchants in the categories described in this parenthetical, it may not be practical or economic to enter into a conventional relationship with an acquirer FI.) If the merchant device is a POS terminal, the latter may operate for the most part in a conventional manner or may alternatively have functionality that actively contributes to the novel transaction flow illustrated in FIG. 2. The POS terminal may be operated in any type of business establishment or retail store, including a "mom and pop" operation all the way up to a big box store that is part of a mega retail chain. In some particularly helpful embodiments, the merchant device may be installed in a store such as a small antiques or collectibles shop or the like in which the low volume of transactions may weigh against the expense and paperwork requirements involved in entering into a merchant-acquirer relationship with an FI.

Among other capabilities, and as will be described further below, the merchant device 202 may display transaction information to be read by the customer (not shown) and manually inputted by the customer into his/her mobile device 204. For example, the merchant device may display the total amount due for the transaction, and a merchant identification number. Alternatively, the merchant ID may be permanently displayed on a sticker affixed to the merchant device 202. (In some embodiments, the merchant identification number may be the account number that identifies the merchant's payment card account to which payment transactions are to be routed. In other embodiments the merchant identification number may require translation into such an account number, e.g., in a manner as described below. If the merchant identification number is the merchant's payment card number, steps may be taken to prevent misuse of the account number. For example, the account corresponding to the account number may be enabled only to have funds transfers credited thereto, but not to receive charges via the payment card system, and with any transfers out of the account in question going into a companion account, with a different number, from which charges may be made.) The merchant identification number may in some embodiments be the merchant's mobile telephone number or another mobile identifier; this may be particularly convenient where the merchant device 202 is a mobile telephone.

In other embodiments, the merchant device 202 may have capabilities for transmitting the transaction information to the customer device 204. The transmitting of the transaction information from the merchant device 202 to the customer device 204 may be via wireless communication such as NFC (near field communication) or alternatively may be via a mobile telephone network using text messaging or the like.

The customer's mobile device 204 may for example be a mobile telephone with capabilities for initiating payment transactions in a payment card system. Operation of a mobile telephone to initiate funds transfers via a payment card system is for example described in commonly assigned U.S. patent application Ser. No. 11/836,945, filed Aug. 10, 2007, entitled "Payment Card Based Remittance System with Designation of Recipient By Mobile Telephone Number", which is incorporated herein by reference. As an alternative, the customer's mobile device 204 may be a PDA with communication capabilities. In some embodiments, the customer's mobile device may initiate a payment transaction by interacting with a website operated by a payment services provider or by the issuer of the customer's payment card account.

FIG. 2 also shows, as included in the system 200, an issuer financial institution 206 which issued the customer's payment card account 208, a payment system 210 (such as the Banknet system referred to above) for routing transactions from issuer to issuer (and also, e.g., from acquirers to issuers), and an issuer financial institution 212 which issued the merchant's payment card account 214. Blocks 206 and 212 should also be understood to represent, respectively, computer systems operated by or on behalf of the customer issuer FI and the merchant issuer FI.

Arrows 216, 218, 220 trace the path of the payment transaction, requested from the customer's mobile device 204, as routed from the customer issuer 206, via the payment system 210 to the merchant issuer 212. Arrows 222, 224 and 226 trace the path of acknowledgement messages from the merchant issuer 212 via the payment system 210 and the customer issuer 206 to the customer's mobile device 204. Arrow 228 represents a confirmation message sent from the merchant issuer 212 to the merchant device 202 to confirm that the payment transaction to pay for the pending sale has or will be credited to the merchant account 214. Upon receiving the confirmation message 228 the merchant may allow the sale or other exchange of value to be completed.

Although only two issuing FIs, one mobile device and one merchant device are shown in FIG. 2, it should be understood that the system 200, in a practical embodiment, may include numerous issuing FIs all connected to the payment system 210, a large number of merchant devices 202 and a very large number of customer mobile devices. Furthermore, the system 210 preferably also operates in accordance with the conventional purchase transaction model illustrated in FIG. 1, and thus may include a considerable number of acquirer FIs as well. Of course, many if not all acquirer FIs may also be issuer FIs.

Figure 3:
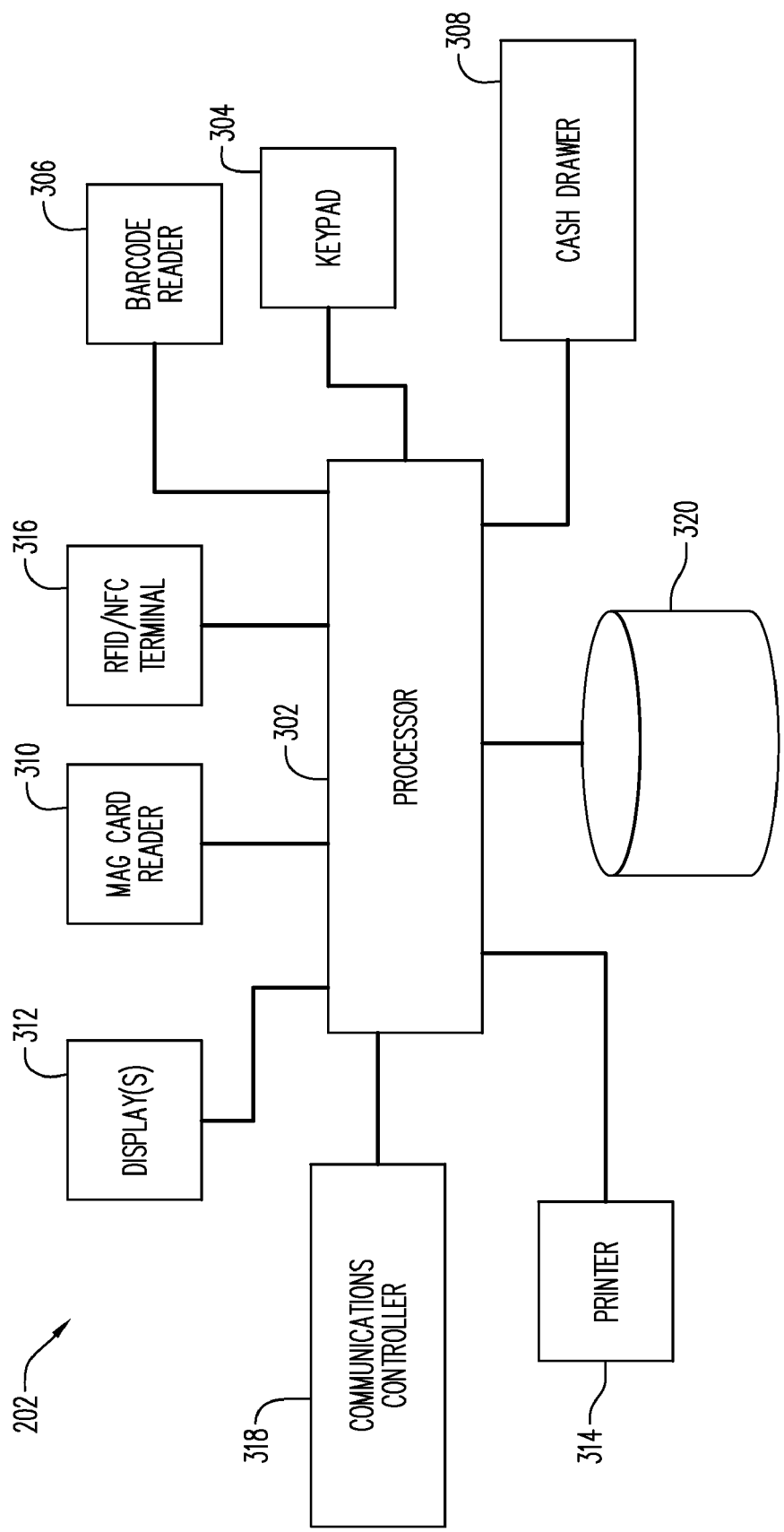
FIG. 3 is a block diagram that illustrates a point of sale terminal that is shown in FIG. 2.

FIG. 3 is a block diagram of a POS terminal as provided in accordance with aspects of the invention to serve (in some embodiments) as the merchant device 202 shown in FIG. 2. In some embodiments, the POS terminal 202 may be largely or entirely conventional in its hardware aspects. Nevertheless, the POS terminal 202 may be programmed in accordance with the aspects of the present invention to provide functionality as described herein.

The POS terminal may include a processing element (or elements) such as the processor 302 shown in FIG. 3. The processor 302 may for example be a conventional microprocessor, and may operate to control the overall functioning of the POS terminal 202. The POS terminal may also include conventional peripheral components, in communication with and/or controlled by the processor 302, such as: (a) a keypad 304 for receiving input from the human operator of the POS terminal; (b) a barcode reader 306 for reading product barcodes from products brought to the terminal for purchase; (c) a cash drawer 308 for storing cash received from customers; (d) a magnetic stripe reader 310 for reading payment card account numbers and related information from magnetic stripe payment cards; (e) one or more displays 312 for providing output (e.g., identifying products presented for purchase and their prices, indicating sales tax due, indicating transaction subtotals and totals, etc.); (f) a printer 314 for printing out sales receipts; (g) a wireless communication terminal/proximity reader 316 for exchanging wireless short range communications/near field communications (NFC) with contactless payment cards and/or with mobile telephone equipped with contactless payment device capabilities; and (h) a communication controller 318 for allowing the processor 302, and hence the POS terminal 202 to engage in communication over data networks with other devices (e.g., a merchant processing system (not shown), an acquirer (not shown) or its transaction processor (not shown), an issuer 212 (FIG. 2) of the merchant's payment card account, etc. (In some embodiments, at least one of the displays 312 may be a touch screen, so as to provide an input function as well as an output function.) In some embodiments, the communication controller, or another communication device coupled to the processor 302, may be provided to allow the POS terminal 202 to transmit and receive text messages or the like via a mobile telephone network (not shown). In addition, the POS terminal 202 may include one or more memory and/or data storage devices (indicated collectively at 320), which may comprise any combination of one or more of a hard disk drive, RAM (random access memory), ROM (read only memory), flash memory, etc. The memory/data storage device(s) 320 may store software and/or firmware that programs the processor 302 and the POS terminal 202 to perform functionality as described herein. Further, the POS terminal may include one or more housings (not shown) which contain and/or support one or more of the other components shown in FIG. 3.

Those who are skilled in the art will recognize that components 310, 316 may be integrated in a single unit, and may include a display/touch screen to allow for user interaction.

Figure 4:
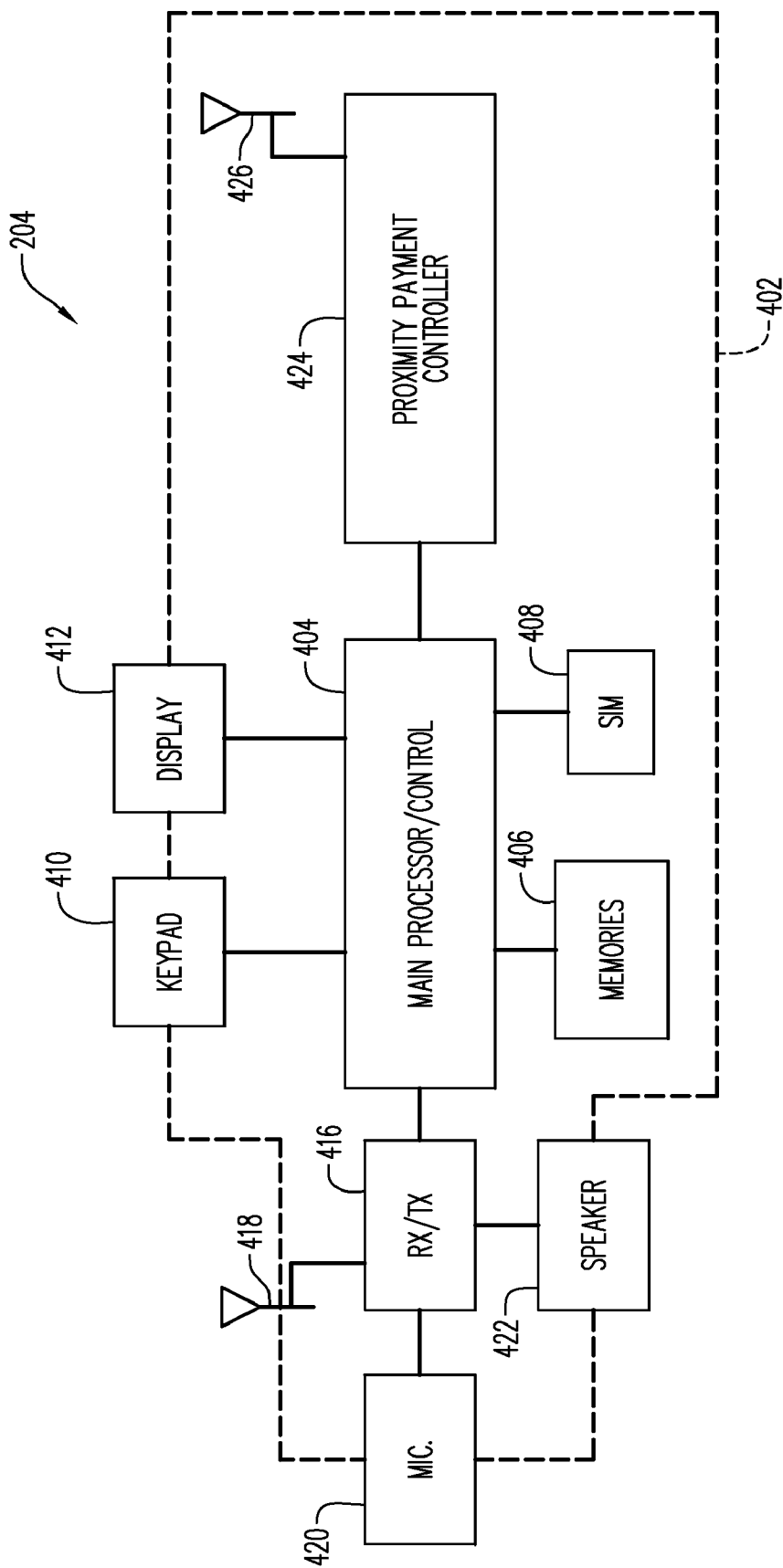
FIG. 4 is a block diagram that illustrates a customer's mobile telephone that is shown in FIG. 2.

FIG. 4 is a block diagram of an example mobile telephone which may serve as the customer's mobile device 204 shown in FIG. 2. The mobile telephone 204 shown in FIG. 4 may also (but need not) have capabilities for functioning as a contactless payment device. In its hardware aspects the mobile telephone 204 may be entirely conventional, and indeed in its software aspects it also may be conventional, and may provide novel functionality as described herein through interaction (via a conventional browser) with a web page that supports initiation of payment transactions. In other embodiments, however, novel functionality as described herein may result at least partially from software and/or firmware that programs the mobile telephone 204.

The mobile telephone 204 may include a conventional housing (indicated by dashed line 402) that contains and/or supports the other components of the mobile telephone 204. The mobile telephone 204 further includes conventional control circuitry 404, for controlling over-all operation of the mobile telephone 402. Preferably the control circuitry 404 is suitably programmed to allow the mobile telephone 204 to engage in data communications and/or text messaging with other devices, and to allow for interaction with web pages accessed via browser software, which is not separately shown. Other components of the mobile telephone 204, which are in communication with and/or controlled by the control circuitry 404, include: (a) one or more memory devices 406 (e.g., program and working memory, etc.); (b) a conventional SIM (subscriber identification module) card 408; (c) a conventional keypad 410 (or touch screen) for receiving user input; and (d) a conventional display 412 (or, again, touch screen) for displaying output information to the user.

The mobile telephone 204 also includes conventional receive/transmit circuitry 416 that is also in communication with and/or controlled by the control circuitry 404. The receive/transmit circuitry 416 is coupled to an antenna 418 and provides the communication channel(s) by which the mobile telephone 204 communicates via the mobile network (not shown). The mobile telephone 204 further includes a conventional microphone 420, coupled to the receive/transmit circuitry 416. Of course, the microphone 420 is for receiving voice input from the user. In addition, a loudspeaker 422 is included to provide sound output to the user, and is coupled to the receive/transmit circuitry 416.

The mobile telephone 204 may also include an integrated circuit (IC) or chipset 424 of the kind embedded in contactless payment cards. For example, the IC 424 is connected to an antenna 426 and operates so as to interact with an RFID/NFC proximity reader of a POS terminal to provide a payment card account number for a purchase transaction at the POS terminal. For example, the IC 424 may be designed/programmed to operate in accordance with the well-known "PayPass" standard (promulgated by the assignee hereof) for contactless payment applications.

Figure 5:
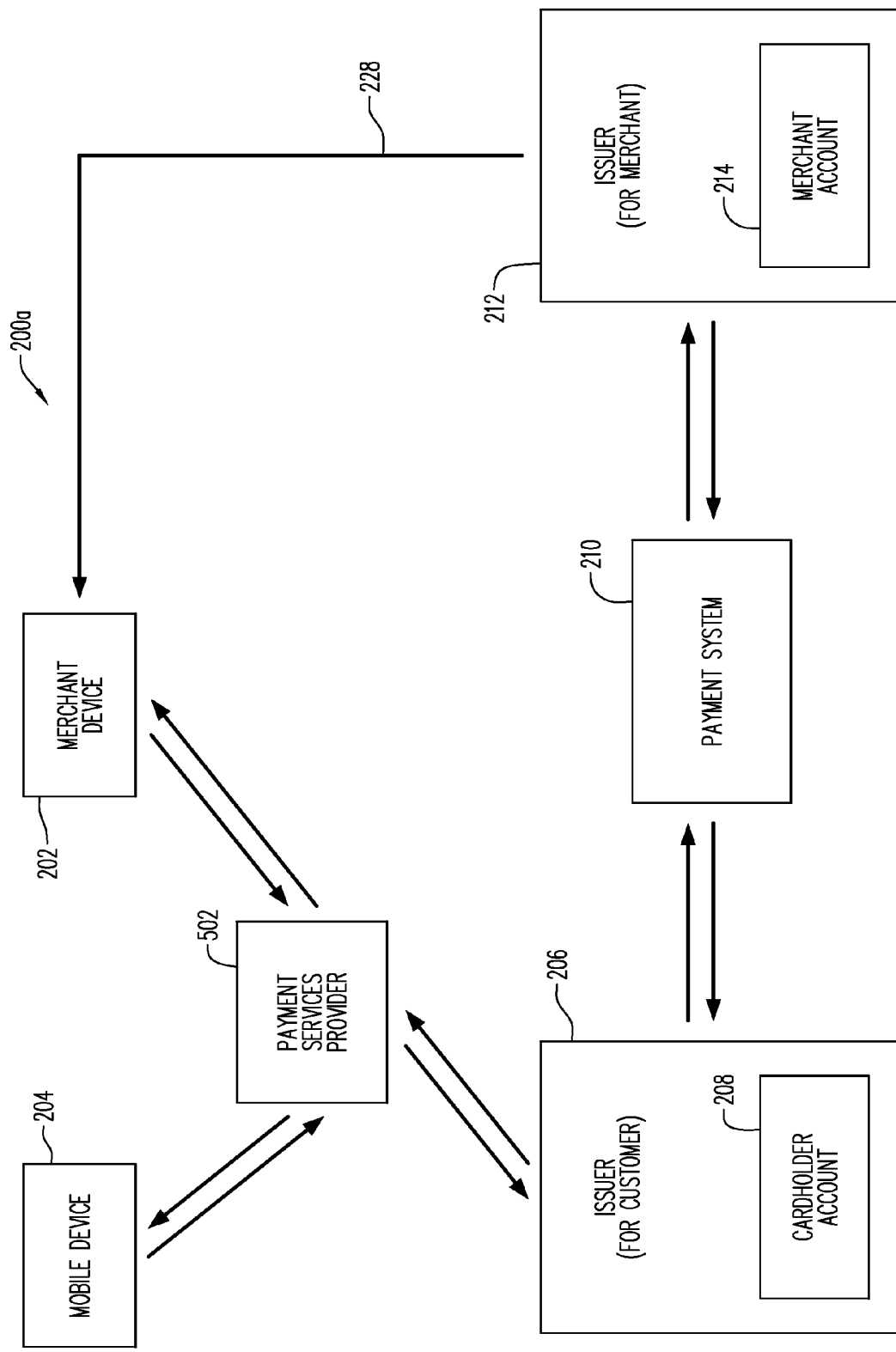
FIG. 5 is a block diagram that illustrates a transaction-handling system according to some other embodiments.

FIG. 5 is a block diagram that illustrates an alternative embodiment (generally represented by reference numeral 200a) of the system shown in FIG. 2. The system 200a of FIG. 5 may include every component shown in FIG. 2, while also including a payment services provider (PSP) computer 502 that provides "on behalf" and/or value added services. For example, as seen from FIG. 5, the PSP computer 502 may exchange communications (by wireless communications and/or landline communications) with each of the merchant device 202, the customer's mobile device 204 and the customer issuer 206. As will be seen, among other functions, the PSP computer 502 may operate to relay communications between the merchant device 202 and the customer's mobile device 204, and between the customer's mobile device 204 and the customer issuer 206. Although only one PSP computer 502 is shown, in practice it may be desirable to provide a considerable number of PSP computers, each serving a respective geographical region.

One potential advantage of the architecture shown in FIG. 5 is that the PSP computer may effectively provide front end processing on behalf of the customer issuer 206 so that the revised transaction flow proposed herein may be implemented with little or no modification to the operations of the customer issuer 206.

The PSP computer or computers 502 may in some embodiments be operated by the payment card association which also operates the payment system 210. Thus the PSP computer(s) 502 may be a vehicle for the payment card association to enhance its service offerings for issuers, cardholders and/or merchants.

Figure 6:
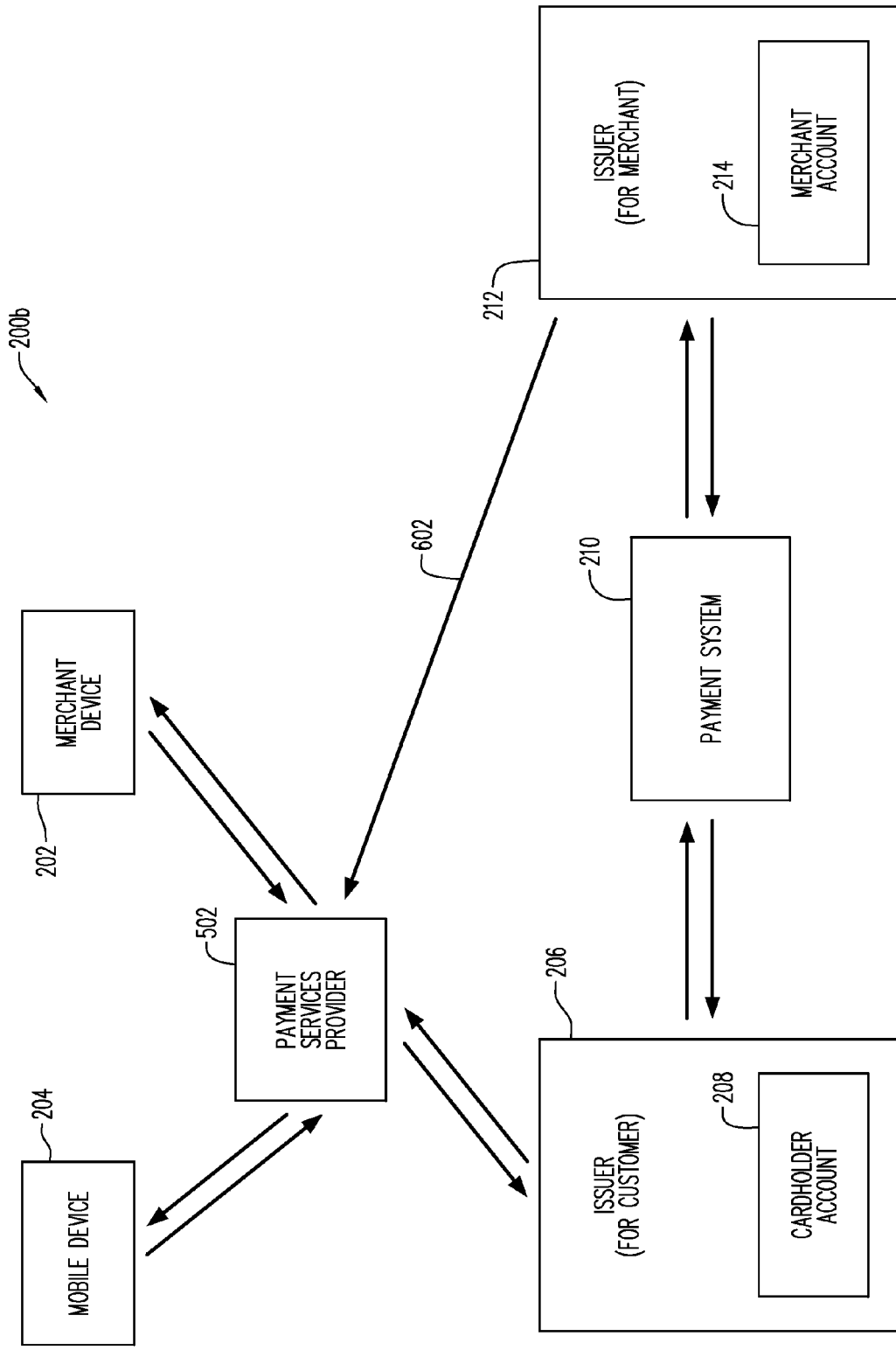
FIG. 6 is block diagram that illustrates another embodiment of a transaction-handling system.

FIG. 6 is a block diagram that illustrates still another embodiment (generally represented by reference numeral 200b) of the systems shown in FIGS. 2 and 5. The system 200b of FIG. 6 includes all of the components shown in FIG. 5. However, in the system embodiment as shown in FIG. 6, the PSP computer 502 performs the additional function of relaying the payment transaction confirmation 602 from the merchant issuer 212 to the merchant device 202. Thus it could be said that the PSP computer 502 is performing "on behalf" services for both the customer issuer and the merchant issuer.

Figure 7:
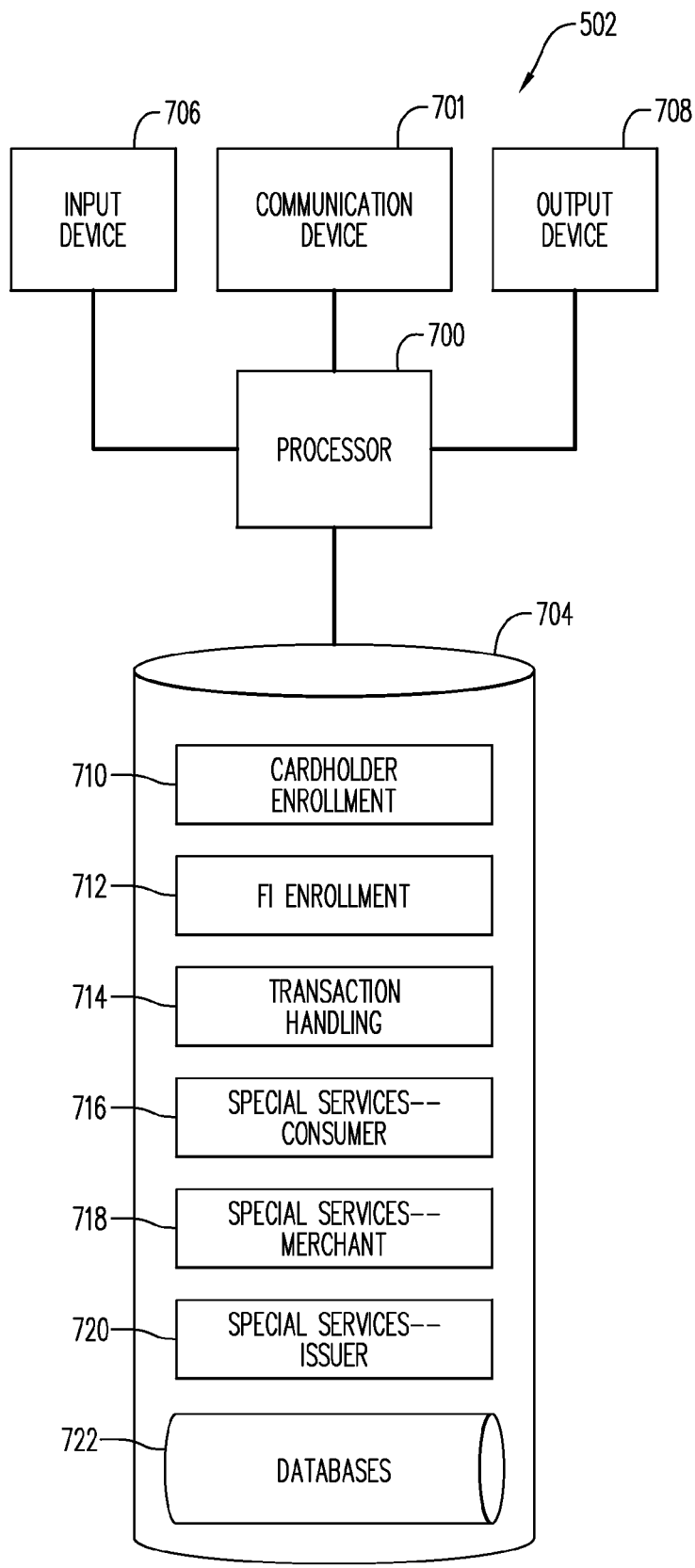
FIG. 7 is a block diagram representation of a computer that provides payment services in the system of FIG. 5 or 6.

FIG. 7 is a block diagram representation of an example PSP computer 502 which may be operated as part of the systems shown in FIG. 5 or FIG. 6.

The PSP computer 502 may be conventional in its hardware aspects but may be controlled by software to cause it to operate in accordance with aspects of the present invention.

The PSP computer 502 may include a computer processor 700 operatively coupled to a communication device 701, a storage device 704, an input device 706 and an output device 708.

The computer processor 700 may be constituted by one or more conventional processors. Processor 700 operates to execute processor-executable steps, contained in program instructions described below, so as to control the PSP computer 502 to provide desired functionality.

Communication device 701 may be used to facilitate communication with, for example, other devices (such as customers' mobile devices 204, merchant devices 202, customer issuer computers 206 and/or merchant issuer computers 212). Communication device 701 may, for example, have capabilities for sending and receiving messages over mobile telephone networks, as well as engaging in data communication over conventional computer-to-computer data networks.

Input device 706 may comprise one or more of any type of peripheral device typically used to input data into a computer. For example, the input device 706 may include a keyboard and a mouse. Output device 708 may comprise, for example, a display and/or a printer.

Storage device 704 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 704 stores one or more programs for controlling processor 700. The programs comprise program instructions that contain processor-executable process steps of PSP computer 502, including, in some cases, process steps that constitute processes provided in accordance with principles of the present invention, as described in more detail below.

The programs may include an application 710 that manages a process by which customers (i.e., cardholders) may enroll themselves and/or their mobile devices with the PSP computer 502. In some embodiments, the cardholder enrollment process may allow the cardholders to enroll themselves with the PSP computer 502 by accessing via their mobile devices 204 a suitable web page hosted by the PSP computer 502. The information gathered from the cardholder during the enrollment process may include payment card account number and mobile telephone number (or other mobile identifier). The enrollment process may also require the cardholder to select a PIN (personal identification number) to be used for security purposes in connection with payment transactions to be initiated by the cardholder via his/her mobile telephone and via the PSP computer 502. Other security measures may also be put in place. The PSP may cooperate with the cardholder's issuing FI to provide security measures that assure that the individual enrolling with the PSP computer 502 is not an impostor.

The storage device 704 may also store an application 712 for managing enrollment of issuing FIs with the PSP computer 502. In some embodiments, actual enrollment of FIs with the PSP computer 502 may be performed by data entry or file downloads managed by an administrative employee of the entity that operates the PSP computer 502. This may occur after person-to-person contacts between an employee of the operator of the PSP computer 502 and an employee of the FI that is seeking enrollment. The FI may be enrolled as a customer issuer, a merchant issuer, or both. In some embodiments, the FI, as part of its enrollment process, may also enroll its account holders (consumers and/or merchants) en masse with the PSP computer 502. Further, after enrollment of an FI, it may thereafter, from time to time, feed to the PSP computer 502 enrollments of consumer and/or merchant holders of payment card accounts issued by the FI.

Another application that may be stored by the storage device 704 is for handling individual transactions and is indicated by reference numeral 714 in FIG. 7. Details of operation of the transaction handling application 714 will be discussed hereinbelow, particularly with reference to FIG. 10.

Still another application 716 may be stored by the storage device 704 and may operate in conjunction with the transaction handling application 714 to provide special value added services to individual consumer cardholders. Examples of such special services will be described below.

In addition, applications 718 and 720, both stored by the storage device 704, respectively provide special value added services to merchants and to issuer FIs.

Reference numeral 722 in FIG. 7 identifies one or more databases that are maintained by the PSP computer 502 on the storage device 704. Among these databases may be a consumer cardholder database, a merchant database, an issuer database and a transaction database.

The application programs of the PSP computer 502 as described above, may be combined in some embodiments, as convenient, into one, two or more application programs. Moreover, the storage device 704 may store other programs, such as one or more operating systems, device drivers, database management software, web hosting software, etc.

Figure 8:
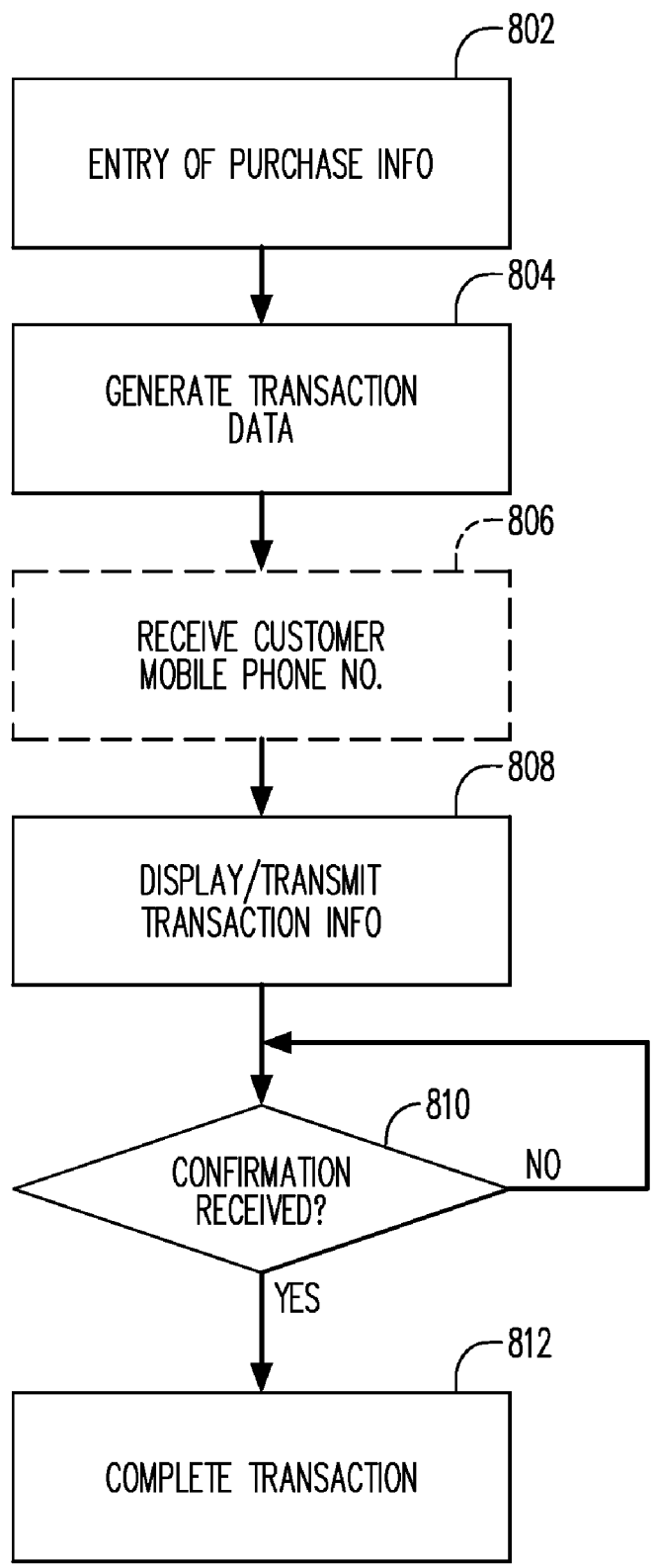
FIG. 8 is a flow chart that illustrates a process that may be performed by a point of sale terminal or other merchant device in connection with a transaction handled as in FIG. 2, FIG. 5 or FIG. 6.

FIG. 8 is a flow chart that illustrates an example sales transaction process that may be performed by the merchant device 202 (FIGS. 2, 5, 6) in accordance with aspects of the present invention.

At 802 in FIG. 8, information to define the transaction is entered into the merchant device 202. For example, if the merchant device is a conventional POS terminal, at least some of the transaction information may be entered by using a barcode scanning component of the POS terminal to scan the product identification barcodes from one or more items presented for purchase by the customer. In accordance with conventional practices, upon reading the product barcodes, the POS terminal retrieves the prices for the items to be purchased (and possibly the product description and other information as well) and generates a subtotal and a total (e.g., including sales tax) for the sale transaction. Some or all of the steps referred to in the previous sentence may be considered to be "generating transaction data" and are represented at 804 in FIG. 8. Moreover, as will be seen, for subsequent stages in the transaction, a set of transaction data for the transaction in question may include identifying codes (e.g. ID numbers) for either or both of the POS terminal and the merchant who is the proprietor of the POS terminal. Thus generating the transaction data may include generating a set of information for the transaction that includes the amount due for the transaction and one or both of the merchant identifier and the POS terminal identifier. Generating the transaction data may also included generating and including in the set of data a unique identifying number for the transaction (transaction identifier/reference number). In some cases, the transaction data generated at 804 may also include line items and/or product descriptions.

From the "first world" (possibly mega-retailer) example embodiment of steps 802-804 as described up to this point, the discussion will now turn to a radically different example embodiment, suitable for use even in a developing country. Assume, then, that the merchant device 202 is a suitably programmed mobile telephone owned by an individual merchant. The merchant may, for example, be a farmer or a dealer in produce, handicrafts, second-hand or new clothing or anything else commonly traded by individual entrepreneurs in the markets of third world countries. It may be assumed further that the merchant conducts his or her business in a stall or at a table in an open air market, without electricity or any other modern convenience. Further assume that the merchant is "banked" only to the extent of holding a payment card account issued by an FI and by being enrolled as a merchant with respect to the payment card account (i.e., the FI in question does not act as a purchase transaction acquirer for the merchant, in this scenario). In such a situation, the entry 402 of the purchase information may consist simply in the merchant entering a sales transaction total amount due into the merchant device/mobile telephone 202 via the keypad of the device 202. (The total amount due may for example have been arrived at by the merchant adding in his/her head—or on a separate calculator—the prices of the items purchased, or may be calculated by a calculator function in the mobile telephone 202 (another example embodiment of 804) from individual item prices manually entered (another example embodiment of 802) one after the other into the mobile telephone by the merchant.) The generating of the transaction data may consist in assembling a transaction data set consisting of just two items of data—amount due, and the mobile telephone number assigned to the merchant device/mobile telephone 202. These two data items may form the payload of a text message/SMS message or other type of information message to be sent to the customer's mobile telephone (mobile device 204). (Alternatively, the mobile telephone network may operate so that, by a "caller ID" feature the mobile telephone number assigned to the merchant device 202 is automatically provided to the customer mobile telephone 204 when the text message or other information message is received.) In any event, the merchant may receive (step 806, FIG. 8) from the customer, by oral face to face communication, the mobile telephone number assigned to the customer's mobile telephone 204 and may enter that number into the merchant's mobile telephone 202, so that the transaction information may be transmitted (step 808, FIG. 8) from merchant device 202 to customer mobile device 204. (For definitional purposes, transmission of the transaction information should be understood to encompass provision of the merchant mobile telephone number from the merchant mobile telephone to the customer mobile telephone via a "caller ID" feature of the mobile network. It should also be noted that the merchant mobile telephone number may serve as a merchant identifier for purposes of the customer's subsequent initiation of a request for a payment transaction.)

As will be expected from previous discussion, and as will be described further below (e.g., in conjunction with FIG. 9), the customer may next operate his mobile telephone 204, using the transaction information transmitted thereto from the merchant device 202, to request that a payment transaction be carried out in the payment system (e.g., system 200, FIG. 2) to transfer the transaction amount from the customer's payment card account 208 to the merchant's payment card account 214. While this is occurring, the merchant/merchant device 202 may wait (block 810, FIG. 8) to receive the confirmation 228 (FIG. 2) that the funds transfer has been or will be accomplished via the channels of the payment card system

210. Once the confirmation is received by the merchant device 810 (the whole process may require only a few seconds), the merchant transfers title in the purchased items to the customer, and the transaction is complete (FIG. 8—block 812).

Before returning to the "mega-retailer" scenario with which we opened discussion of FIG. 8, there will be a brief mention of advantages provided by aspects of the present invention in the above-described third world market scenario. Perhaps most important, the process of FIG. 8 is cashless, so that neither the merchant nor the customer takes on the often large risks of carrying and holding cash in a third world environment. Also, this process leverages on the already existing prevalence of mobile telephones among third world merchants and consumers. The banking relationships required by the participants are also such as may be established and maintained at relatively low cost, thus minimizing the economic barriers to adoption. Still further, the system is an open one, in the sense that the parties need not have a relationship with the same financial institution/service provider, but need only have low level banking relationships with respective FIs that belong to a widespread payment card system such as that organized by the assignee hereof. Finally, the parties do not need to even use the same mobile network operator (MNO), so long as their respective MNOs are interoperative.

Returning now to the previous example in which the merchant device 202 was a conventional POS terminal, it will be recalled that the POS terminal 202 had received entry of purchase information (802 in FIG. 8) and had generated transaction data for the sales transaction (804 in FIG. 8). It may next possibly be the case (806, FIG. 8) that the customer will orally advise the POS terminal operator of the customer's mobile telephone number (or other mobile identifier), so that the POS terminal operator may enter the customer's mobile telephone number (or other mobile identifier) into the POS terminal, as a prelude to the POS terminal transmitting the transaction data (808 in FIG. 8) to the customer's mobile device. (As suggested above, the transmission may be a text message/SMS or the like.) However, in a high-volume retail environment, it may be preferred not to take the time for such an oral exchange of information and manual entry of the telephone number. Instead, for example, the POS terminal may transmit the transaction information to the customer's mobile device via NFC (near field communication) or the like. As another alternative embodiment of 808, the POS terminal may display the transaction information (e.g., total amount due and merchant/POS terminal identifier) for the customer to manually enter into his/her mobile device. (The merchant/POS identifier may even be permanently displayed on a sticker or placard, for example.) Although the NFC (or such) example embodiment of step 808 may be preferable for a high volume environment, any of the other alternatives set forth above may be quite appropriate for a retail establishment in which the transactions are relatively infrequent.

In still another embodiment of step 808, the POS terminal 202 may transmit the transaction information to a payment services provider computer 502 (FIGS. 5 and 6), which may in turn relay the information to the customer's mobile device 204. Presumably in this embodiment of step 808 it may be necessary for the POS terminal to receive, either by wireless communication or by operator data entry, a mobile telephone number or other addressing information for the customer's mobile device 204. In this embodiment, the POS terminal may include the mobile telephone number or other addressing information for the customer's mobile device 204 in the transmission to the payment services provider computer 502, so that the payment services provider computer 502 may in turn route the transaction information to the customer's mobile device 204. In another variation, the POS terminal 202 may include a transaction reference number in the transmission to the payment services provider computer 502, and may also transmit the transaction reference number to the customer's mobile device 204. (Or, the POS terminal 202 may display the transaction reference number, and the customer may enter the transaction reference number into the mobile device 204.) The customer may then use the mobile device 204 to call in to the payment services provider computer 502 and use the transaction reference number to identify to the payment services provider computer 502 the transaction information to be relayed from the payment services provider computer 502 to the customer's mobile device 204.

In still another variation, the transaction reference number may be unique only to the merchant, so that the merchant identifier may also be needed to index the transaction information within a database maintained by the payment services provider computer 502. The merchant identifier may be transmitted to the customer's mobile device 204 by the POS terminal 202 or may be displayed by the POS terminal 202 for the customer to read and enter into the mobile device 204. As an alternative to the possibilities stated in the previous sentence, when the customer calls in to the payment services provider computer 502 with the mobile device 204, the mobile device 204 may report its current location (via GPS-Global Positioning System-data or the like) to the payment services provider computer 502; the payment services provider computer 502 may then infer, from the location information, the identity of the merchant at which the customer and his/her device are currently located. For such a purpose, the payment services provider computer 502 may maintain a database of merchant locations.

In some embodiments, the transaction information transmitted by the POS terminal 202 to the customer's mobile device 204 or to the payment services provider computer 502, as the case may be, may include line item information that identifies individual product items that are included in the current sale transaction.

Even in the case of the mega-retailer example, the process of FIG. 8 may end as in the third world market example, with the merchant device 202 (currently assumed to be a POS terminal) waiting (810 in FIG. 8) to receive from the merchant's FI (or a PSP acting as an intermediary) confirmation of the payment transaction in favor of the merchant's account 214. The transaction is then completed (step 812). For example, the merchant releases goods purchased to the customer and/or uses the merchant device 202 to print a receipt for the transaction and gives the receipt to the customer.

It should be understood that, for relatively small and/or mobile merchants, the third world model described above may be conveniently adopted even in a developed country, and that the merchant device 202 accordingly may be a mobile telephone in the case of any merchant who lacks or prefers not to use a POS terminal, regardless of the merchant's location.

According to one possible feature of the above described merchant device process, and although not indicated in FIG. 8, the process could have a time-out feature such that the merchant device aborts the transaction if the payment transaction confirmation is not received within a predetermined waiting period.

Figure 9:
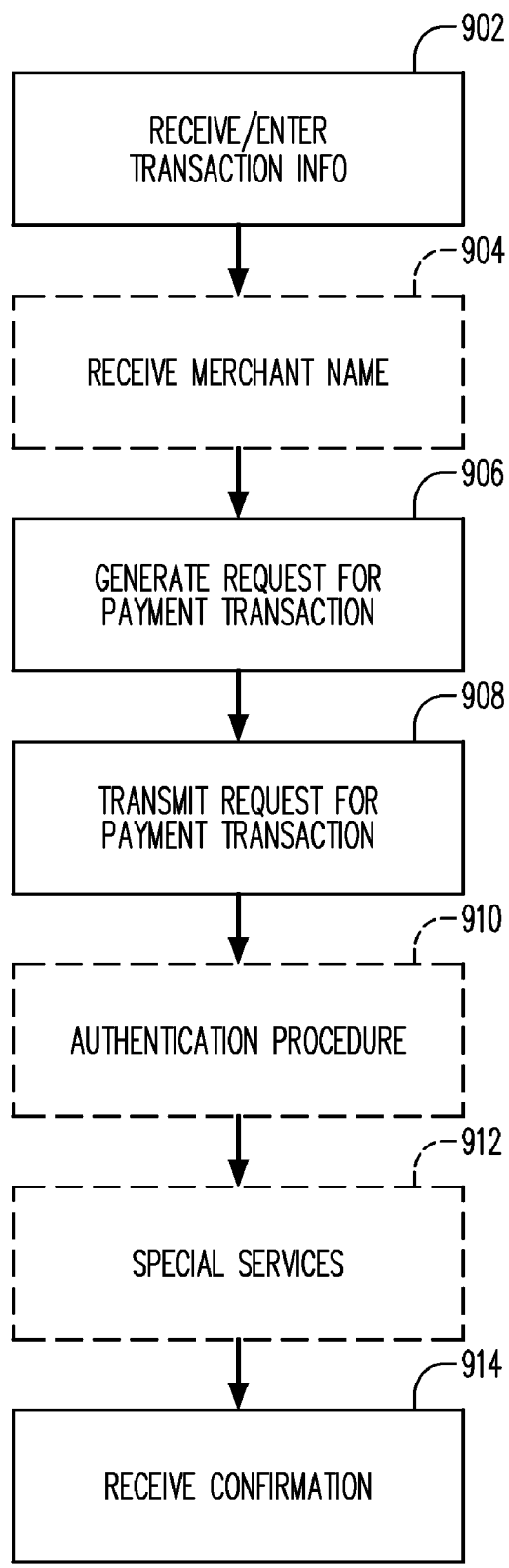
FIG. 9 is a flow chart that illustrates a process that may be performed by a customer's mobile device in connection with a transaction handled as in FIG. 2, FIG. 5 or FIG. 6.

FIG. 9 is a flow chart that illustrates a process that may be performed by the customer's mobile device 204 in connection with a transaction handled as in FIG. 2, FIG. 5 or FIG. 6.

At 902 in FIG. 9, the mobile device 204 may receive the transaction information or the transaction information may be entered into the mobile device 204 by the customer's interaction with the user interface offered by the mobile device 204. If the mobile device receives the transaction information, this may occur by wireless transmission from either the merchant device 202 or from the payment services provider 502. In some embodiments, the transaction information and/or other information received by the customer's mobile device 204 may (as indicated at 904 in FIG. 4) include the name of the merchant. For example, the name of the merchant may be transmitted to the customer's mobile device 204 by the payment services provider 502 or by the customer's issuing FI 206. In effect, the payment services provider 502 may serve as a trusted third party to verify the identity of the merchant and to protect the customer from dealing with an impostor. The payment services provider may be able to vouch for the merchant because the merchant has gone through an enrollment process with the payment services provider or with an FI that is trusted by the payment services provider. In this way, the customer may be assured of the merchant's identity before the customer initiates the payment transaction.

Next, at 906, the customer's mobile device 204 generates a request for a payment transaction. In some embodiments, the request for a payment transaction includes the transaction amount and a merchant identification code. The request for the payment transaction may also include an identification code or number that identifies the customer. This code or number may be explicitly included in the request or may be implicitly generated as, e.g., a caller identification that identifies the mobile telephone number assigned to the mobile device 204. The identifier for the customer may for example thus be the mobile telephone number assigned to the mobile device 204 or the payment card account number that identifies the customer's payment card account that is to be used to fund the payment transaction. In some embodiments, the merchant identification code may be one or more of a mobile telephone number assigned to the merchant device 202, or the payment card account number that identifies the merchant's payment card account that is to be credited by the payment transaction, or an identifier that otherwise identifies the merchant, such as a code used to index the merchant's record in a database maintained by a payment services provider computer 502. In addition, an identifier for the particular merchant device 202 may also be included in the payment transaction request.

In other embodiments, the request need only refer to the transaction by a transaction reference number, with the payment services provider computer 502 being relied upon to look up the other transaction information, such as merchant ID and transaction amount.

At 908, the customer's mobile device 204 transmits the request for a payment transaction. In some embodiments, the mobile device 204 transmits the request for a payment transaction to the FI 206 (FIG. 2) which issued the customer's payment card account. In other embodiments, the mobile device 204 transmits the request for a payment transaction to a payment services provider, as in FIGS. 5 and 6.

In some embodiments, the request for a payment transaction may explicitly include the customer's payment card account number, the merchant's payment card account number and the amount of the requested payment transaction, in which case the request may be handled in a straightforward manner by the customer's FI 206. In other embodiments, the customer and/or the merchant may be identified by their respective mobile telephone numbers or in another manner apart from their payment card account numbers. If so, the customer's FI may translate the customer's mobile telephone number (whether explicitly or implicitly (by caller ID) included in the request) into the customer's payment card account number, and the payment system 210 may translate the merchant's mobile telephone number into the merchant's payment card account number and may route the transaction accordingly. In other embodiments, the payment services provider computer 502 may perform one or both of the translations referred to in the previous sentence.

In some embodiments, the customer's mobile device, and hence the customer, may be identified by a SIM identifier or the like rather than by mobile telephone number.

In some embodiments, the payment transaction request transmitted by the customer's mobile device 204 may include line item information that identifies individual product items that the customer is purchasing.

In some embodiments, an authentication procedure (block 910) may be included in the process of FIG. 9. This may go beyond requiring the customer to enter a PIN in order to access the payment transaction request function. For example, the customer's issuer 206, and/or the payment services provider computer 502 acting on behalf of the customer's issuer, may selectively require additional authentication in the case of certain transactions, based on various criteria. These criteria may include, for example, the amount of the requested payment transaction, the time of day and/or day of the week, the item(s) being purchased, the identity of the customer and/or the identity of the merchant. Recent or past account activity or inactivity may also be taken into consideration in determining whether to require authentication.

The authentication procedure may include an exchange of text messages and/or electronic mail messages (or another type of information message) via the customer's mobile device 204 or a telephone conversation via the customer's mobile device 204. The exchange of messages and/or the telephone conversation may be handled by a human employee of the customer issuer 206 and/or the payment services provider 502. Alternatively, the exchange of information messages may be automatically conducted by computer on the part of the customer issuer 206 and/or the payment services provider 502, or the customer may be required to "converse" with an automated voice response system operated by the customer issuer 206 and/or the payment services provider 502. The exchange of messages or telephone conversation may include issuing a "challenge" to the customer, such as requiring the customer to provide one or more items of security information (e.g., date of birth, mother's maiden name, birthplace, home telephone number, home address, Social Security number, etc.).

In other embodiments, and assuming that the customer's mobile device is a mobile camera-phone, the authentication procedure may call for the customer to use the mobile device to take his/her picture and send it to the authenticating authority so that an individual employee of the authenticating authority may compare the picture with another picture of the customer that is previously on file.

In some embodiments, demographic information about customers as collected by the customers' mobile network providers may be provided to merchants for market research purposes.

In some embodiments, the process of FIG. 9 may include value added services (block 912), provided to the customer by either of both of the customer's issuer 206 and the payment services provider 502. These value added services may be such as cannot readily be provided in the conventional transaction flow depicted in FIG. 1.

For example, if the customer requests a payment transaction at a time when the customer has exceeded his/her credit limit or has depleted his/her debit card account, the customer's issuer 206 (or the payment services provider acting on behalf of the customer's issuer 206) may respond to the request for a payment transaction with a message (sent to the customer's mobile device 204) offering to make an overdraft or credit facility available to the customer, so that the request for a payment transaction can be honored.

According to another special service, the customer's issuer 206 and/or the payment services provider 502 (in this case not necessarily acting on behalf of the customer's issuer 206) may present the customer (via a message or messages to the mobile device 204) with one or more promotional offers and/or virtual coupons which the customer may avail himself/herself with to fund at least a portion of the payment transaction. For example, based on the identity of the merchant (and the customer not previously being enrolled with the merchant), the payment services provider 502 may offer on behalf of the merchant that a portion of the payment transaction will be funded by the merchant if the customer enrolls in the merchant's customer loyalty program.

In another example, an offer provided by a third party may be contingent on the customer adding an additional item to the pending transaction. For example, say the customer is purchasing an item that requires installation, and is also purchasing a warranty on the item. The manufacturer or warranty provider may offer to be a source of funding for a portion of the purchase price, contingent on the customer purchasing installation services for the item from the merchant. This offer benefits the merchant, by increasing the merchant's installation business; benefits the customer, by reducing the customer's cost for the transaction; and benefits the manufacturer/warranty provider by increasing the likelihood that installation will be performed correctly, thereby decreasing the likelihood of a warranty claim.

In still another example, suppose that the customer is purchasing an item that requires installation during a particularly busy time period such as the holiday season. In this case, a third party installation provider may offer to partially fund the transaction on the condition that the customer agree to defer installation until after the busy period is over.

Alternatively, the customer's issuer 206 (or the payment services provider 502 acting on behalf of the customer's issuer 206) may offer to fund part of the payment transaction if the customer agrees to open a deposit account with the customer's issuer. (Additional examples and a further discussion of "split-funding" of payment transactions will be described below in conjunction with FIG. 15.)

At 914 in FIG. 9, the customer's mobile device 204 receives a message that confirms that the payment transaction has been executed (possibly subject to a subsequent clearing operation). The customer's mobile device 204 may for example receive this confirmation message from the customer's issuer 206 or from the payment services provider computer 502. However, in alternative embodiments step 914 may be omitted, and the customer may effectively be informed that the payment transaction has gone through based on the merchant's willingness to complete the sales transaction, release the goods to be purchased, issue a receipt, etc. in response to the merchant device 202 receiving confirmation of the payment transaction.

Figure 10:
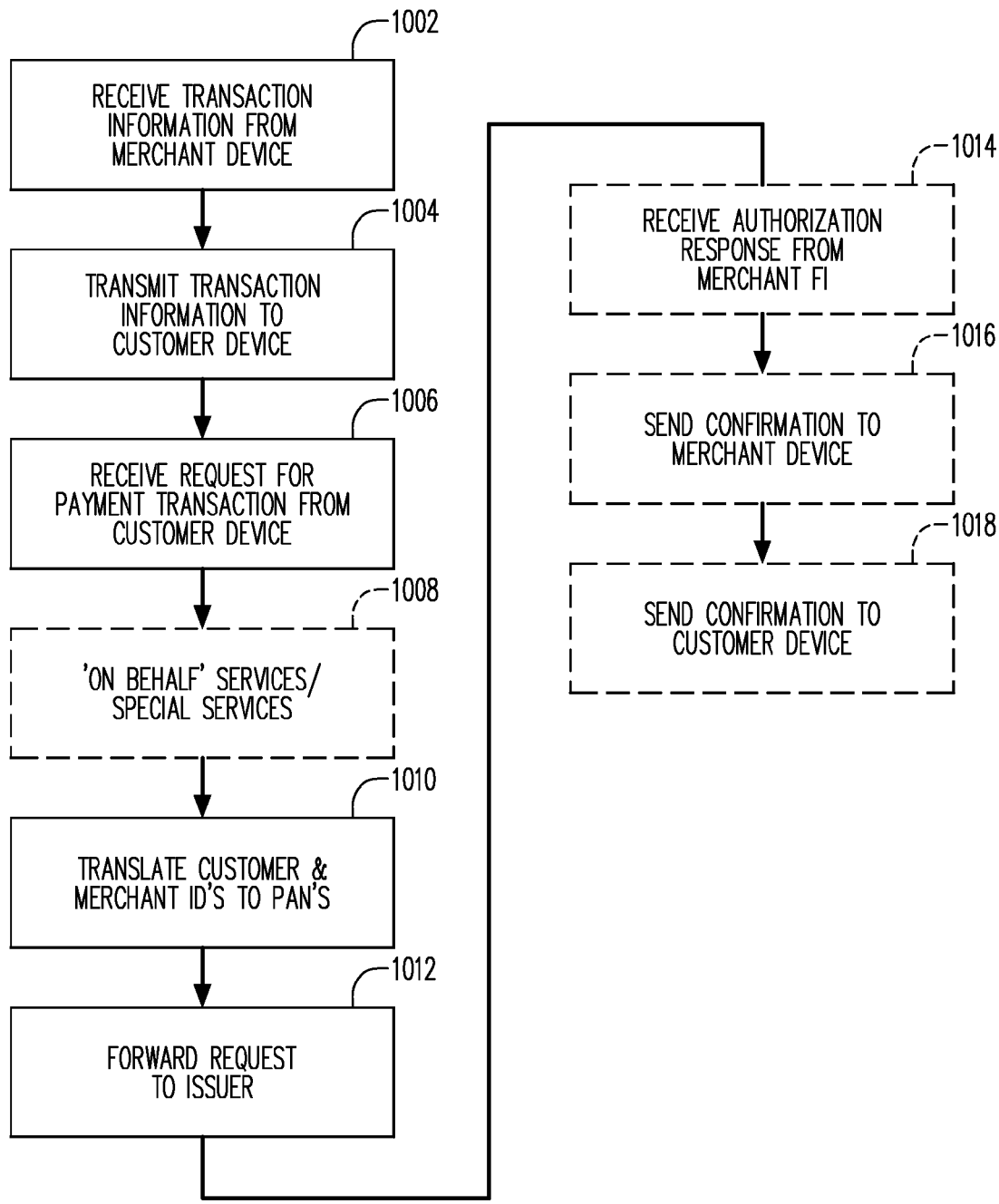
FIG. 10 is a flow chart that illustrates a process that may be performed by the computer of FIG. 7.

FIG. 10 is a flow chart that illustrates a process that may be performed by the payment services provider computer 502.

At 1002 in FIG. 10, the payment services provider computer 502 receives the transaction information from the merchant device 202. As will be appreciated from previous discussion, the transaction information may include the amount of payment to be made for the transaction and merchant identifying information, such as a merchant number or a mobile telephone number that was assigned to the merchant device 202. (As noted above, the merchant device 202 may be a mobile telephone, or alternatively a POS terminal or PDA.) In some cases, the transaction information also includes a transaction reference number assigned by the merchant device, for use in subsequent communications among the payment services provider computer 502, the merchant device 202 and the customer's mobile device 204. The transaction information may also include details of the transaction, including information that identifies the items purchased, line item pricing, promotional offers or coupons made available by the merchant, etc. The transaction information may also include addressing information to allow the payment services provider computer 502 to contact the customer's mobile device 204. Further, the transaction information may include particulars about the merchant device and/or capabilities of the merchant device (e.g., whether the merchant device is a POS terminal or a mobile phone; if the latter, what the capabilities are of the mobile phone; whether the merchant device is NFC/RFID capable). Another category of transaction information may include encryption- and/or authentication-related information, such as the merchant's public keys for digital signatures, etc. Still another category of transaction information may include information that identifies the merchant's physical location, or the location of the merchant device. The addressing information may for example be a mobile telephone number assigned to the customer's mobile device 204.

At 1004 in FIG. 10, the payment services provider computer 502 may use the addressing information for the customer's mobile device 204 to transmit at least some of the transaction information to the customer's mobile device 204. In some embodiments, the payment services provider computer 502 may have looked up the name of the merchant based on the merchant identifying information received from the merchant device 202, and the payment services provider computer 502 may append the name of the merchant to transaction information that the payment services provider computer 502 transmits to the customer's mobile device.

At 1006 in FIG. 10, the payment services provider computer 502 receives a request for a payment transaction from the customer's mobile device 204. In some embodiments, the request may consist entirely of an indication to the effect of "yes, I want to go ahead with the transaction" plus the transaction reference number. In other embodiments, the request for the payment transaction, as received from the customer's mobile device, may include more detail, such as transaction amount (amount to be transferred by the payment transaction), merchant identifier (e.g., merchant mobile telephone number) and customer identifier (e.g., customer mobile telephone number—included explicitly in the request or implicitly by caller ID, or customer's payment card account number, or another code or reference that identifies the customer).

At 1008, in some embodiments, the payment services provider computer 502 may undertake an authentication procedure or procedures, as described above in connection with step 910 in FIG. 9, and/or the payment services provider computer 502 may offer or provide certain special services, promotional offers, credit offers, as described above in connection with step 912 in FIG. 9. In some cases, the special services, for example, may be initiated earlier in the process, such as in conjunction with step 1004. That is, the transaction information that the payment services provider computer 502 transmits to the customer's mobile device at 1004 may include offers of special services, etc.

Another type of special service that may be provided by the payment services provider computer, and not mentioned up to now, may entail enforcing restrictions on usage of the customer's payment card account 208. Consider, for example, a payment card account set up by a parent for his/her college student child. The parent may be able to set up restrictions as to (a) which merchants the payment card account may be used to pay (college bookstore and dining hall only, e.g.), and/or (b) a maximum dollar amount of transactions allowed per period of time (e.g., $100.00 per week). The payment card account may be restricted as invalid for purchase transactions or other transactions that are not payment transactions as described herein, so that the payment services provider computer (in enforcing the parental restrictions) effectively may have complete control over the use of the payment card account.

In another embodiment, the customer's issuing FI 206, rather than the payment services provider computer, may enforce restrictions of the sort described in the previous paragraph.

In other embodiments, when the child requests a payment transaction of a kind that is not permitted by existing parental restrictions, the PSP computer 502 or the customer FI 206 may send a real time inquiry message to the parent, asking whether the parent will allow the particular transaction. If the parent approves the requested payment transaction, the PSP computer 502 or the customer FI 206 proceeds with the requested payment transaction. If the parent does not approve, the requested payment transaction is declined. With this arrangement, it will be appreciated that the child may phone the parent ahead of time to alert the parent that the child intends to request a payment transaction that falls outside the established restrictions.

In another example in which a restricted use payment card account may be useful, consider the case of a well-to-do individual who hires a personal assistant to help in managing his/her household. The employing individual may set up a restricted-use payment card account for the assistant to use in paying some of the household expenses, but again limited to certain suppliers (e.g., grocery store, house-cleaning contractor, utility companies, etc.) and/or to a maximum amount per period of time.

At 1010, the payment services provider computer 502, to the extent required, may translate the customer identifying information (e.g., customer's mobile telephone number) into the customer's (funding) payment card account number for the requested payment transaction, and the payment services provider computer 502 may translate the merchant's identifying information (e.g., the merchant's mobile telephone number) into the payment card account number for the merchant's account to which the payment transaction is to be routed.

Next, at 1012, the payment services provider computer 502 may forward the request for the payment transaction to the customer's issuing FI 206. As forwarded by the payment services provider computer 502, the request for the payment transaction may include all information that the customer's issuing FI 206 may need to process the payment transaction in a conventional manner. Thus, the request as forwarded by the payment services provider computer 502 to the customer's issuing FI 206 may include the payment card account number for the funding payment card account (issued by the FI 206 to the customer), the amount of the payment transaction, and the payment card account number for the merchant's payment card account to which the payment transaction is to be routed.

In some embodiments, the payment services provider computer 502 may have no more involvement in the transaction. For example, the payment transaction may proceed from the customer's FI 206 to the merchant's FI 212 via the payment system 210, and the merchant's FI 212 may provide a confirmation 228 (FIG. 5) to the merchant device 202 to allow for completion of the sales transaction between the merchant and the customer. In other embodiments, however, the payment services provider computer 502 may be in the communication path between the merchant FI 212 and the merchant device 202, as illustrated in FIG. 6. That is, and as indicated at 1014 in FIG. 10, the payment services provider computer 502 may receive from the merchant FI 212 an authorization response to indicate that the merchant's account exists and is in a proper status to receive the payment, so that the payment transaction will go through (or has gone through). Then, at 1016 in FIG. 10, the payment services provider computer 502 may provide a confirmation of the payment transaction to the merchant device 202 to allow for completion of the sales transaction. Also, and optionally, the payment services provider computer 502 may provide confirmation of the payment transaction to the customer's mobile device 204 (step 1018). In some embodiments, to facilitate at least steps 1014 and 1016, the request for the payment transaction, as forwarded from the payment system 210 to the merchant FI 212, may include a transaction reference number that the merchant FI 212, in turn, includes in the authorization response. In that way, the payment services provider computer 502 is able to retrieve its record of the transaction upon receiving the authorization response, and is able to provide a proper confirmation message to the merchant device 202.

Figure 11:
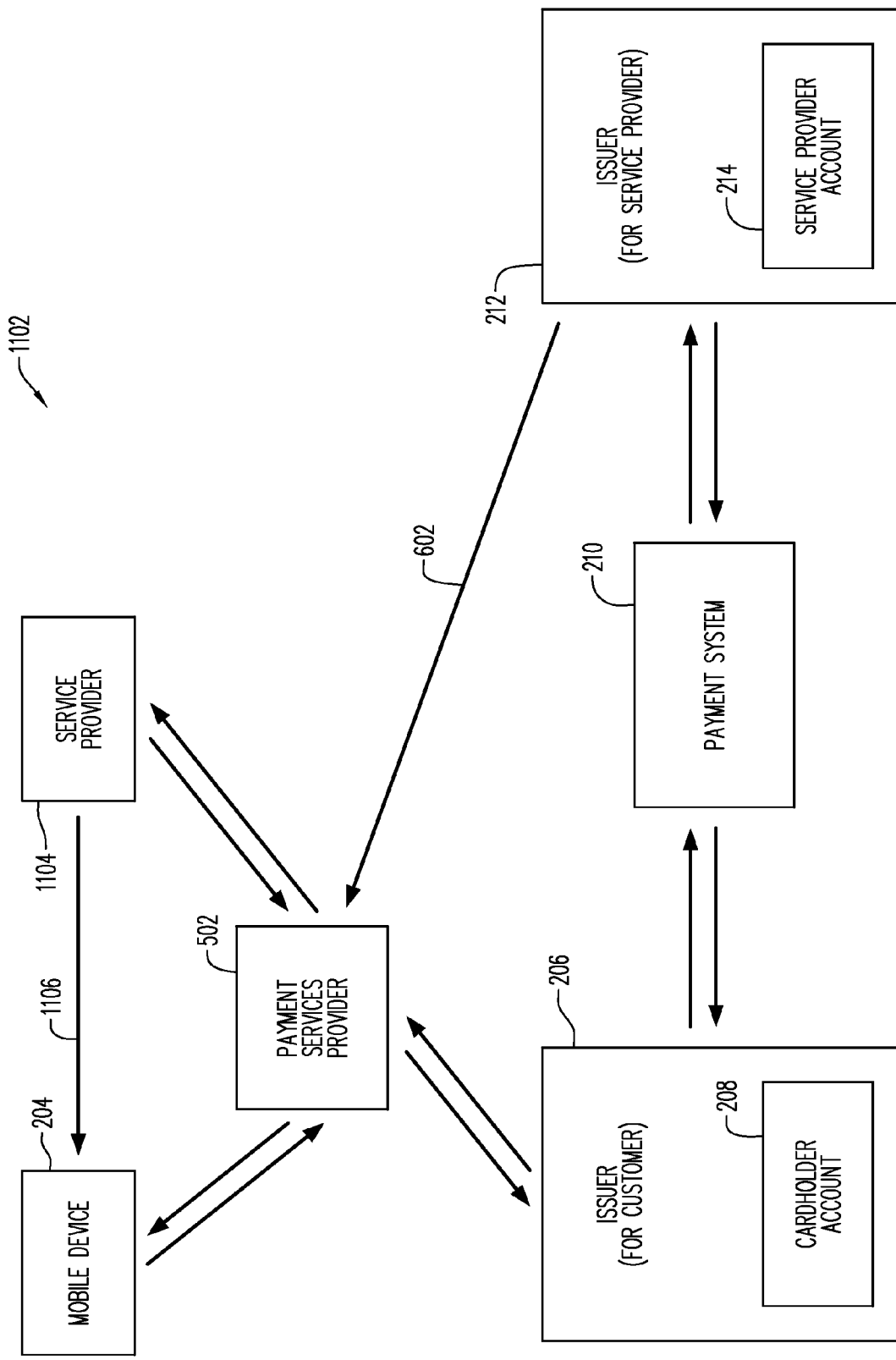
FIG. 11 is a block diagram that illustrates a bill payment system according to some embodiments.

FIG. 11 is a block diagram that illustrates a bill payment system 1102 according to some embodiments. The bill payment system 1102 may have the following components in common with the payment system 200*b* shown in FIG. 6: (a) mobile device 204 (customer's mobile device); (b) payment services provider computer 502; (c) issuing FI 206 (for the customer's payment card account); (d) payment system 210; and (e) receiving/issuing FI 212. However, instead of the merchant device 202 shown in FIG. 6, the bill payment system 1102 includes a service provider computer 1104 operated by or on behalf of a service provider such as a public utility, a daily or periodical publication or any other entity with a large customer base that it regularly sends bills to. Moreover the receiving issuer FI 212 in the case of the system 1102 receives payment transactions for the service provider rather than for a retail merchant.

Figure 12:
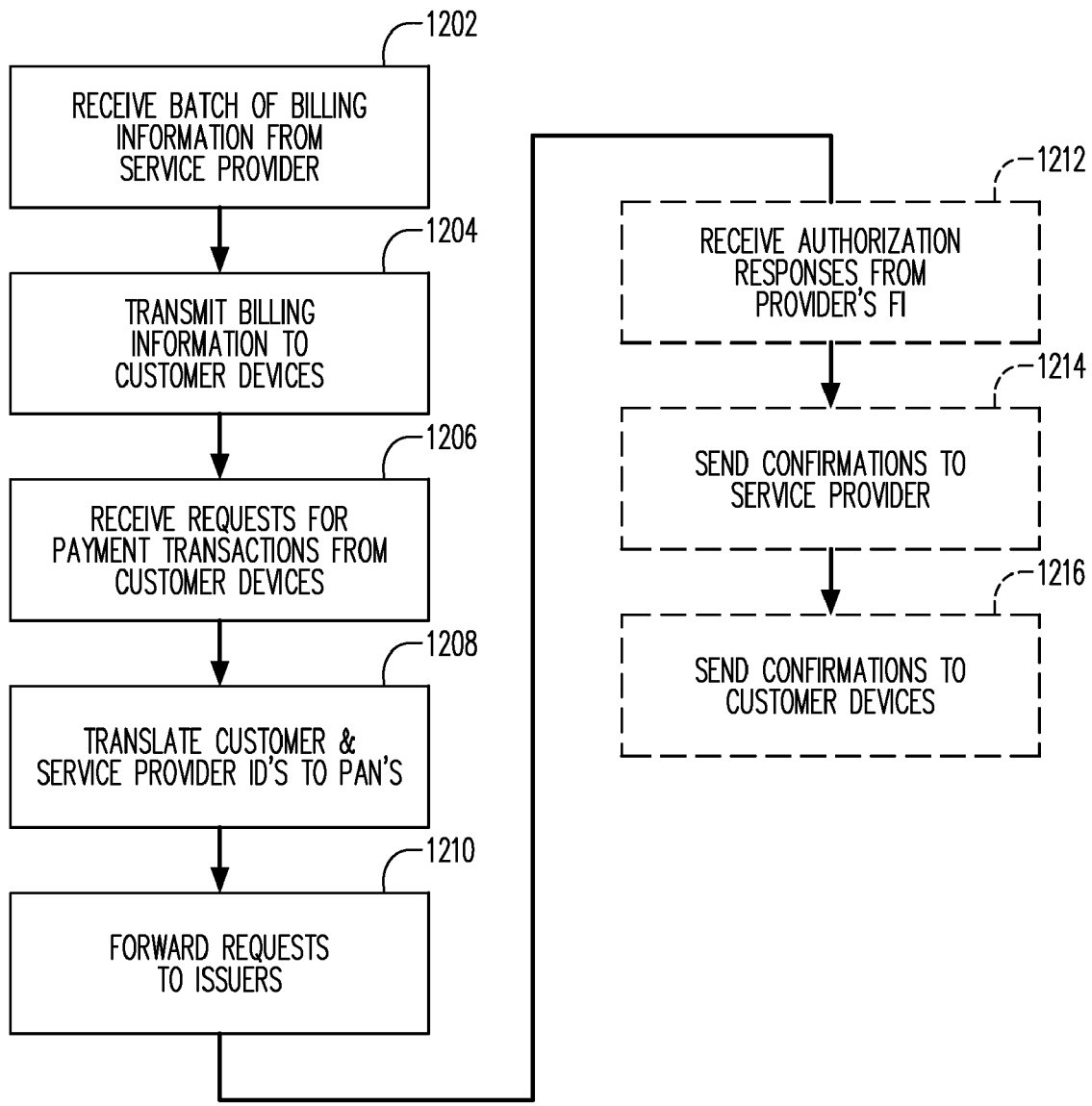
FIG. 12 is a flow chart that illustrates a process that may be performed by a payment services provider computer in the system of FIG. 1.

FIG. 12 is a flow chart that illustrates a process that may be performed by the payment services provider computer 502 in the bill payment system 1102 of FIG. 11.

At 1202 in FIG. 12, the payment services provider computer 502 receives a batch of billing information from the service provider 1104 (for example, an electric utility company). Let us assume that the billing information concerns monthly electricity bills from the service provider 1104 to its residential subscribers (or at least for those who have signed up for bill payment through the system 1102 illustrated in FIG. 11). The billing information may contain numerous records, each of which represents a single bill. Each record may contain, for example, the amount of the bill, a customer identifier for the customer in question, and the mobile telephone number for the customer in question (or alternatively, the mobile telephone number may serve as the customer identifier), a record number, etc. (In some embodiments, the service provider 1104 may also send the billing information directly to the customer's mobile device 204, as indicated by arrow 1106 in FIG. 11.)

At 1204 in FIG. 12, the payment services provider computer 502 transmits the billing information in each record to the mobile device 204 (only one shown) that belongs to the respective customer for the billing record. In effect, the information transmitted to the customer's mobile device may indicate, "Your monthly electric bill is $XXX.XX. Do you wish to pay with your credit/debit card?" Assuming that the customer indicates "yes" via suitable interaction with the mobile device 204, then at 1206, the payment services provider computer 502 effectively receives a request from the customer for a payment transaction to settle the bill.

At 1208, the payment services provider computer 502, to the extent required, may translate the customer identifying information (e.g., the customer's mobile telephone number or the customer's account number with the service provider) into the customer's (funding) payment card account number for the requested payment transaction, and the payment services provider computer 502 may translate the service provider's identifying information into the payment card account number for the service provider's payment card account to which the payment transaction is to be routed. In one alternative, the payment services provider computer 502 may be programmed to automatically interpret the customer's affirmative response to the question transmitted at 1204 as a request to initiate a payment transaction to the service provider's payment card account number that the payment services provider computer 502 had previously associated with the batch of billing information received at 1202. In fact, the batch of billing information may have included instructions from the service provider 1104 as to the payment card account number for the service provider's payment card account 214 (FIG. 11).

It will be appreciated that step 1208 may typically occur with respect to each customer to whom the billing information was sent at 1204.

At 1210, the payment services provider computer 502 may forward the customers' request for payment transactions to the customers' various issuing FIs 206 (only one shown in FIG. 11). As forwarded by the payment services provider computer 502, the requests for payment transactions may include all information required for the customers' issuers 206 to process the payment transactions in a conventional manner. Thus, the requests forwarded by the payment services provider computer 502 each may include the payment card account number for the customer's payment card account 208, the amount of the payment transaction (amount due on the bill), and the payment card account number for the service provider's payment card account 214.

In some embodiments, the payment services provider computer 502 may have no more involvement in the service provider's billing activities for the current billing cycle. For example, the payment transaction may proceed from the customer's FI 206 to the service provider's FI 212 via the payment system 210, and the service provider 1106 may receive a confirmation message or report from its FI 212 as to payments received. However, in an alternative arrangement, as illustrated in FIG. 11 and step 1212 in FIG. 12, the payment services provider computer 502 may receive, from the service provider's FI 212, individually or in batches/reports, confirmations or authorization responses from the service provider's FI 212 to indicate that the payment transaction had gone through or would do so, via normal clearing activities. Then at 1214 in FIG. 12, the payment services provider computer 502 may provide confirmations of the payment transactions (individually or in batches) to the service provider computer 1104. In addition, as indicated at 1216, the payment services provider computer 502 may confirm the payment transaction and settlement of the bill to each customer's mobile device 204.

Figure 13:
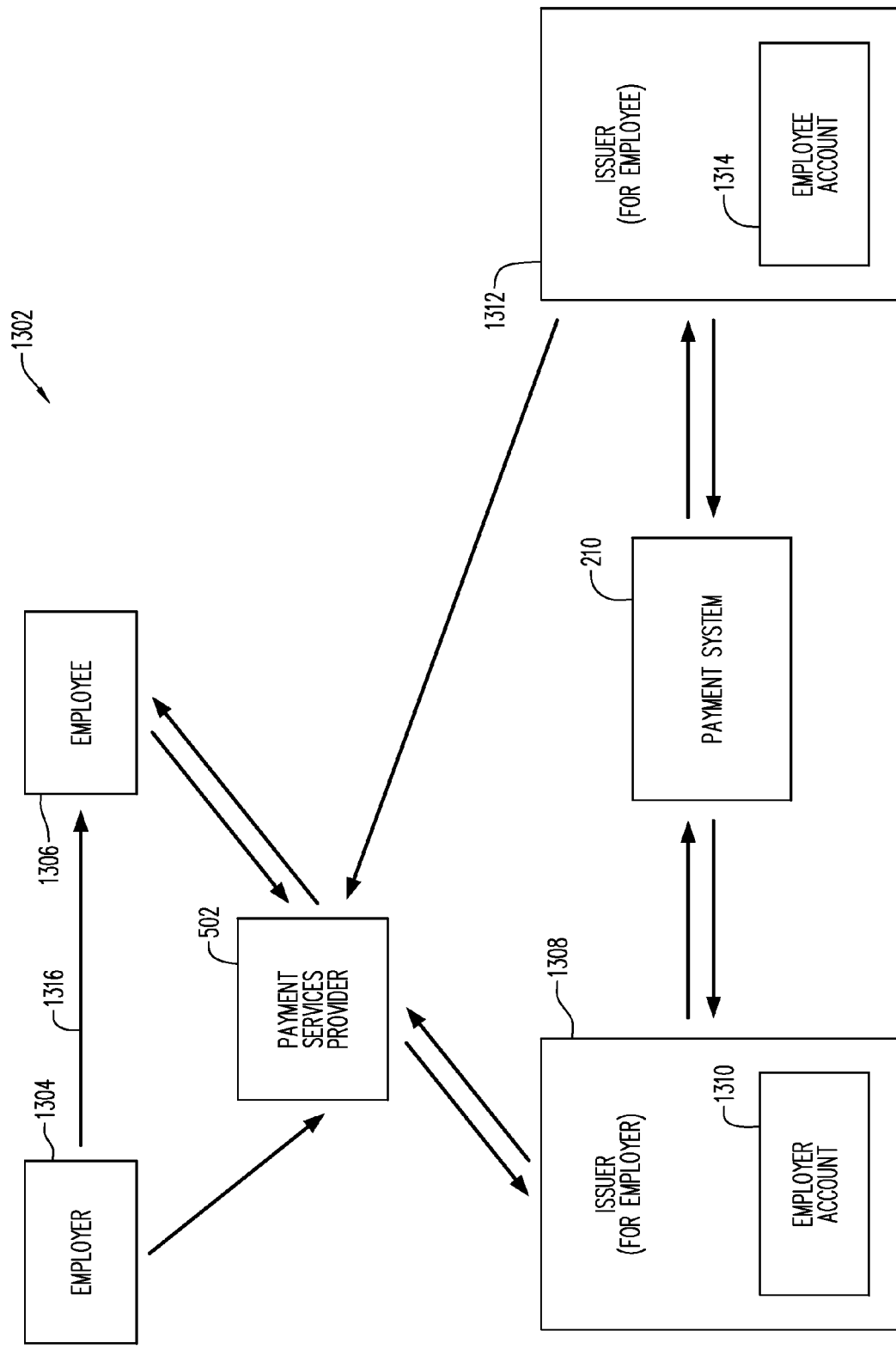
FIG. 13 is a block diagram that illustrates a payroll disbursement system according to some embodiments.

FIG. 13 is a block diagram that illustrates a payroll disbursement system 1302 according to some embodiments.

The payroll disbursement system 1302 may include an employer computer 1304 operated by or on behalf of an employer organization which pays its employees via the system 1302. The employer may, but need not, have a considerable number of employees on its payroll. Block 1306 in FIG. 13 represents a mobile telephone or home computer that belongs to an employee of the employer.

The payroll disbursement system 1302 further includes a payment services provider computer 502 and a payment system 210 as in systems shown in FIGS. 2, 5, 6 or 11, for example. In addition, the payroll disbursement system includes an FI 1308 that issued a payment card account 1310 to the employer, and issuing FIs 1312 (only one shown) that issued payment card accounts 1314 to employees.

Figure 14:
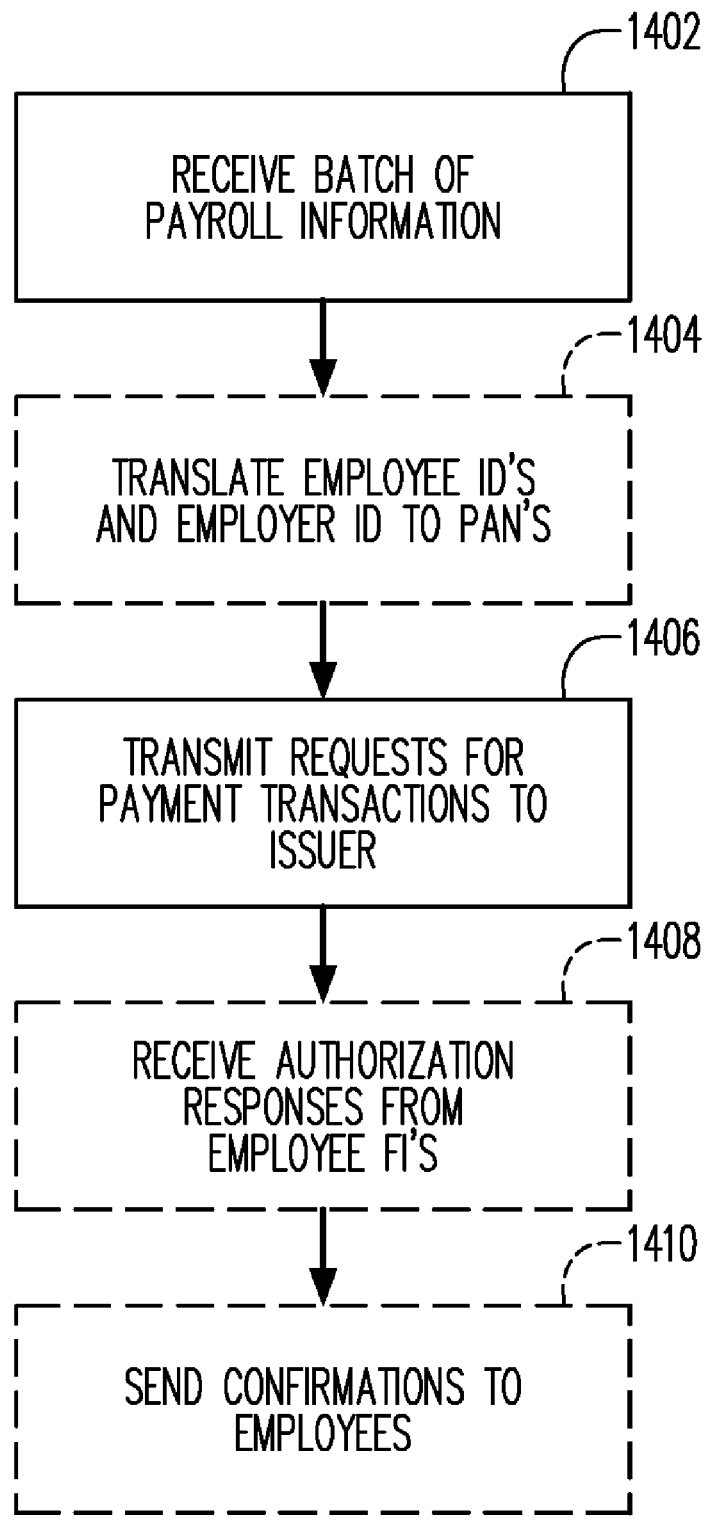
FIG. 14 is a flow chart that illustrates a process that may be performed by a payment services provider computer in the system of FIG. 13.

FIG. 14 is a flow chart that illustrates a process that may be performed by the payment services provider computer 502 in the system of FIG. 13.

At 1402 in FIG. 14, the payment services provider computer 502 receives a batch of payroll disbursement information from the employer computer 1304 (or alternatively from a payroll services provider retained by the employer). The payroll disbursement information may include a number (potentially a large number) of records, each representing wages or salary to be paid to a respective employee for the current employment period. Each record may contain, for example, a record number, the net amount that is being paid to the employee in question, an employee identification number (which could be the employee's Social Security number), the mobile telephone number for the employee in question, or a payment card account number that identifies the payment account to which the employee's wages or salary are to be disbursed. (In some embodiments, the employer may also provide a paystub or virtual paystub directly to the employee device, as indicated by arrow 1316.)

At 1404, the payment services provider computer 502, to the extent required, may translate the employee identifier into the payment card account number for the employee's payment card account to which the wage/salary payment is to be routed.

At 1406 in FIG. 14, the payment services provider computer 502 may forward, to the employer's issuing FI 1308, requests for payment transactions with respect to each of the wage/salary payments indicated by the batch of payroll information received at 1402. For example, each of the requests for a payment transaction may include the amount of the payment, the payment card account number that identifies the employer's payment card account 1310 from which the payment transaction is to be funded, and the payment card account number that identifies the employee's payment card account to which the payment transaction is to be routed.

In some embodiments, the payment services provider computer 502 may have no more involvement in the payroll disbursement process. For example, the payment transactions may proceed from the employer's FI 1308 to the employees' FIs 1312 via the payment system 210, and either no confirmations of the payment transactions are provided to the employees, or the employees receive confirmations of the payment transactions from their individual FIs 1312. Alternatively, however, and as indicated at 1408 in FIG. 14, the payment services provider computer 502 may receive, from each of the employees' FIs 1312, confirmations or authorization responses to indicate that the payment transactions had gone through or would do so (via normal clearing activities).

Then, at 1410, the payment services provider computer 502 may provide confirmations of the payment transactions to the employee devices 1306. (Although not indicated in FIG. 14, the payment services provider computer 502 may also provide confirmations of the payment transactions to the employer computer 1304.)

Figure 15:
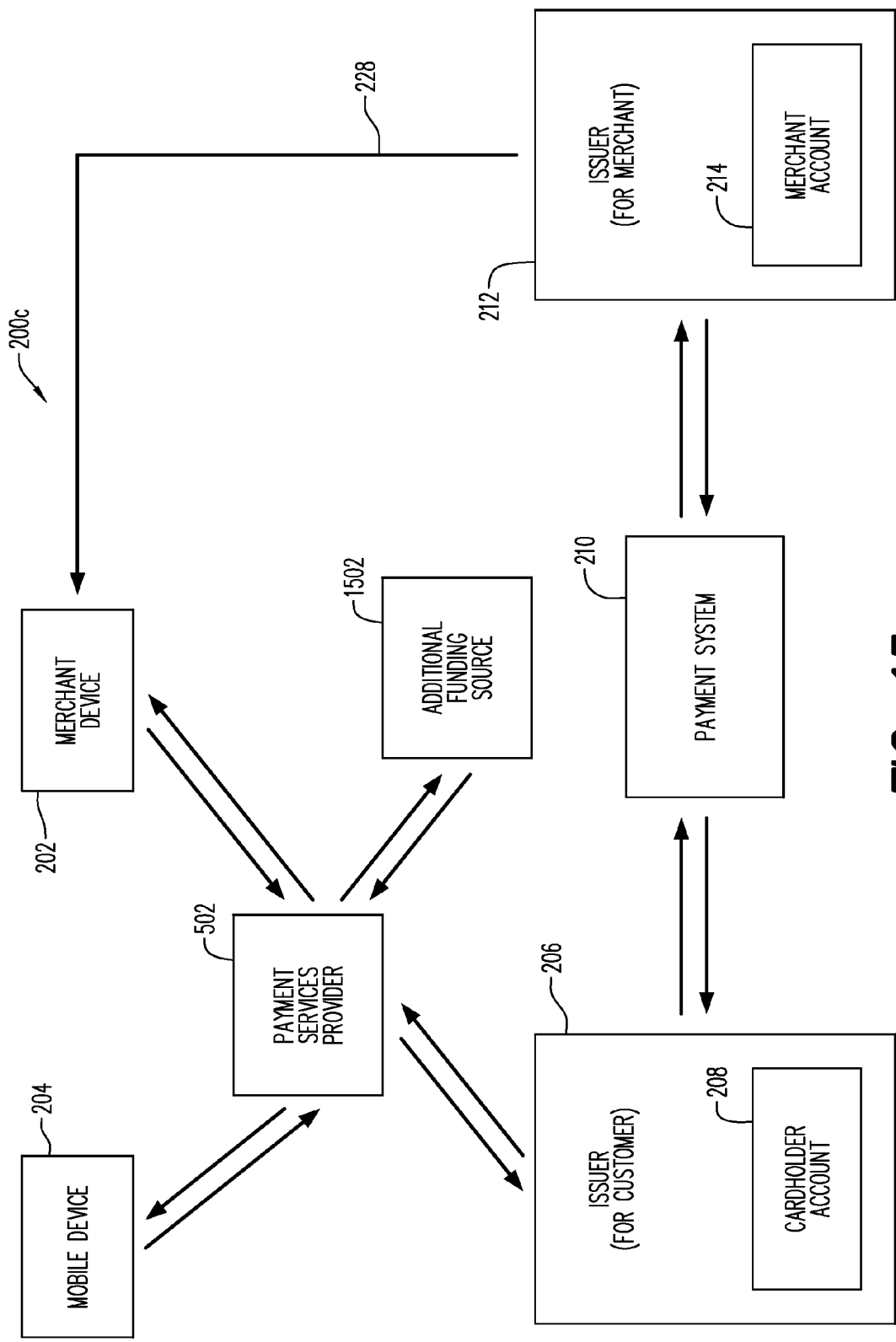
FIG. 15 is a block diagram that illustrates still another embodiment of a transaction-handling system.

FIG. 15 is a block diagram that illustrates still another embodiment of a transaction-handling system, indicated by reference numeral 200c.

For example, the transaction-handling system 200c of FIG. 15 may have all of the components shown in FIG. 5, including the merchant device 202, the customer's mobile device 204, the payment services provider computer 502, the customer's issuing FI 206, the payment system 210 and the merchant's issuing FI 212. In addition, the system 200c may include a computer that is represented by block 1502 in FIG. 15 and that is operated by an entity that, at least on occasion, may partially or completely fund payment transactions instead of the payment transactions being totally funded from the customer's payment card account 208. As indicated in FIG. 15, the additional funding source computer 1502 may be in data communication, at least from time to time, with the payment services provider computer 502.

Figure 1:
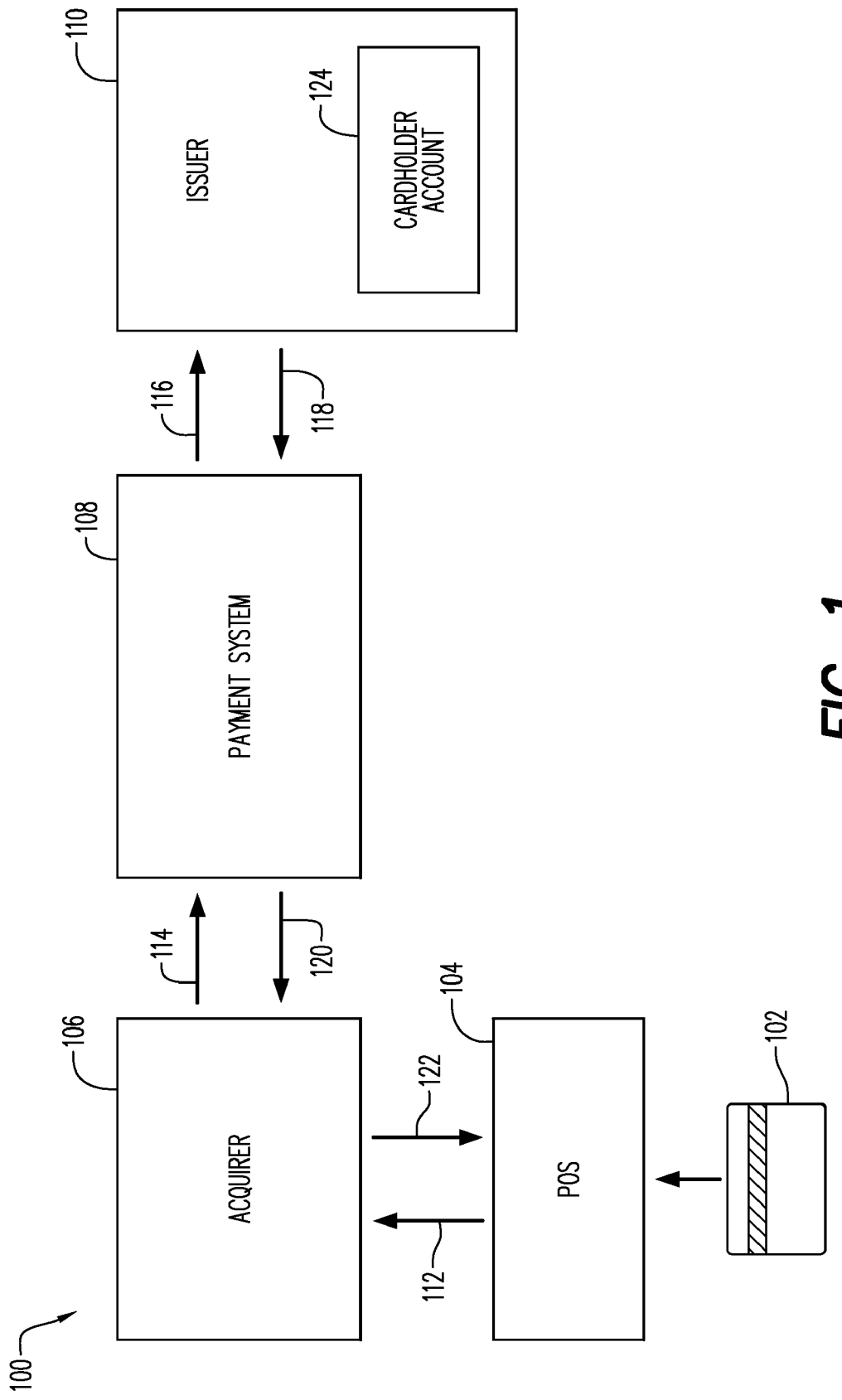
FIG. 1 is a block diagram that illustrates a conventional payment system.

For example, the payment services provider computer 502 and/or the additional funding source computer 1502 may have capabilities for tracking all payment card transactions (e.g., both payment transactions as described herein and conventional purchase transactions as illustrated in FIG. 1) initiated by the customer, and may detect when a particular transaction, for which information is received from a merchant, is qualified to be partially funded by a loyalty program. For example, such a loyalty program may be operated by the customer's issuing FI 206. Upon detection of a qualified transaction, the payment services provider computer 502 may send to the customer's mobile device 204, along with the transaction information, an inquiry as to whether the customer wishes to apply a rewards payment to the pending transaction. If the customer assents, then a portion of the funds for the payment transaction may come from the additional funding source 1502, and the amount to be charged to the customer's payment card account 208 for the payment transaction may be reduced by the amount supplied by the additional funding source 1502.

In connection with split-funding transactions, the payment services provider computer 502 may perform one or more of the following roles, among others: (a) acting as a control agent for the transaction; (b) acting as a storage facility for information and logic used (i) to determine whether split-funding should occur, and (ii) to identify funding sources and to determine how to split the sourcing of funds between the sources; and (c) initiating two or more payment transactions to implement the split-funding transaction.

One manner in which a split-funding transaction takes place may be as follows: (A) A request for the transaction is received by the payment services provider computer 502 from the customer's mobile device 204, with the request including for example the total amount to be paid and a merchant identifier. (B) The payment services provider computer 502 may identify the transaction as qualifying for split funding based on (1) an explicit instruction from the customer or (2) the payment services provider computer 502 recognizing predefined characteristics of the transaction. (In the former case, the request from the customer may include indications of the funding accounts and how the payment is to be split between the accounts; in the latter case, the payment services provider computer 502 may detect the qualification of the transaction for split funding from one or more of the following attributes, among others: customer ID, customer payment card account number, merchant ID, merchant payment card account number, detail(s) of the items purchased, date and/or time, type of transactions, etc.) (C) After recognizing the transaction as qualified for split funding, the payment services provider computer 502 may temporarily suspend the transaction and then may access a database record or other stored information to determine how to split the payment amount, and between what source accounts, and further may automatically seek and obtain any required approvals (e.g., from a funding third party) or alternatively the funding third party may indicate to the payment services provider computer 502 how much funding the third party will provide. (D) To the extent necessary, the payment services provider computer 502 may initiate funding authorization requests to verify that the indicated source account(s) have sufficient funds to support the indicated payment transactions. (E) Next the payment services provider computer 502 may initiate a respective payment transaction to implement each partial funding portion of the split-funded transaction. (F) Upon receiving confirmation that the payment transactions have completed, the payment services provider computer 502 may initiate a confirmation message to the customer and/or to the merchant (or alternatively confirmation to the merchant may come from the merchant's issuer.) In the event that one or more of the payment transactions fails (e.g., due to insufficient funds or denial of authorization), the payment services provider computer 502 may take such actions (depending, e.g., on stored instructions for such a situation) as (a) transmitting a message to the customer's mobile device 204 to report the failed transaction (e.g., due to refusal to approve the transaction by a third party or for reasons described above) and possibly to ask the customer for an alternative funding source or for instructions to default to an alternative manner (such as an alternative split-funding arrangement) of funding the transaction; (b) following stored instructions to substitute an alternative funding or split-funding arrangement for the arrangement that failed.

Clearing and settlement of the constituent payment transactions may be undertaken in normal course and may in effect clear and settle the entire transaction. Split funding of transactions may not require any modification of conventional payment transaction practices. Nevertheless, in some embodiments it may be useful to modify some conventional processes or provide new processes to facilitate handling of failed transactions. Such processes may include reversals of payment transactions, establishment of rules of hierarchy as to funding sources and establishment of rules as to the order in which the constituent payment transactions are to be executed.

In alternative versions of the system 200c, the additional funding source need not be a loyalty program. One possible alternative is a product specific or merchant specific electronic coupon. As another alternative, and in the case of payment for medical or dental services or prescription drugs, the additional funding source may be a medical or dental insurance plan. For the latter case, the merchant device may, as part of the transaction information transmitted to the payment services provider computer 502, include claim information required by the insurance plan, and that information may be passed on by the payment services provider computer 502 to the insurance plan as a request for coverage of the payment. In some embodiments, such as the medical insurance example, the actual source of the additional funding may be a payment card account (not shown) issued by another issuer (not shown) to the underwriter (loyalty plan, insurance plan, etc.) of the additional funding.

Figure 16:
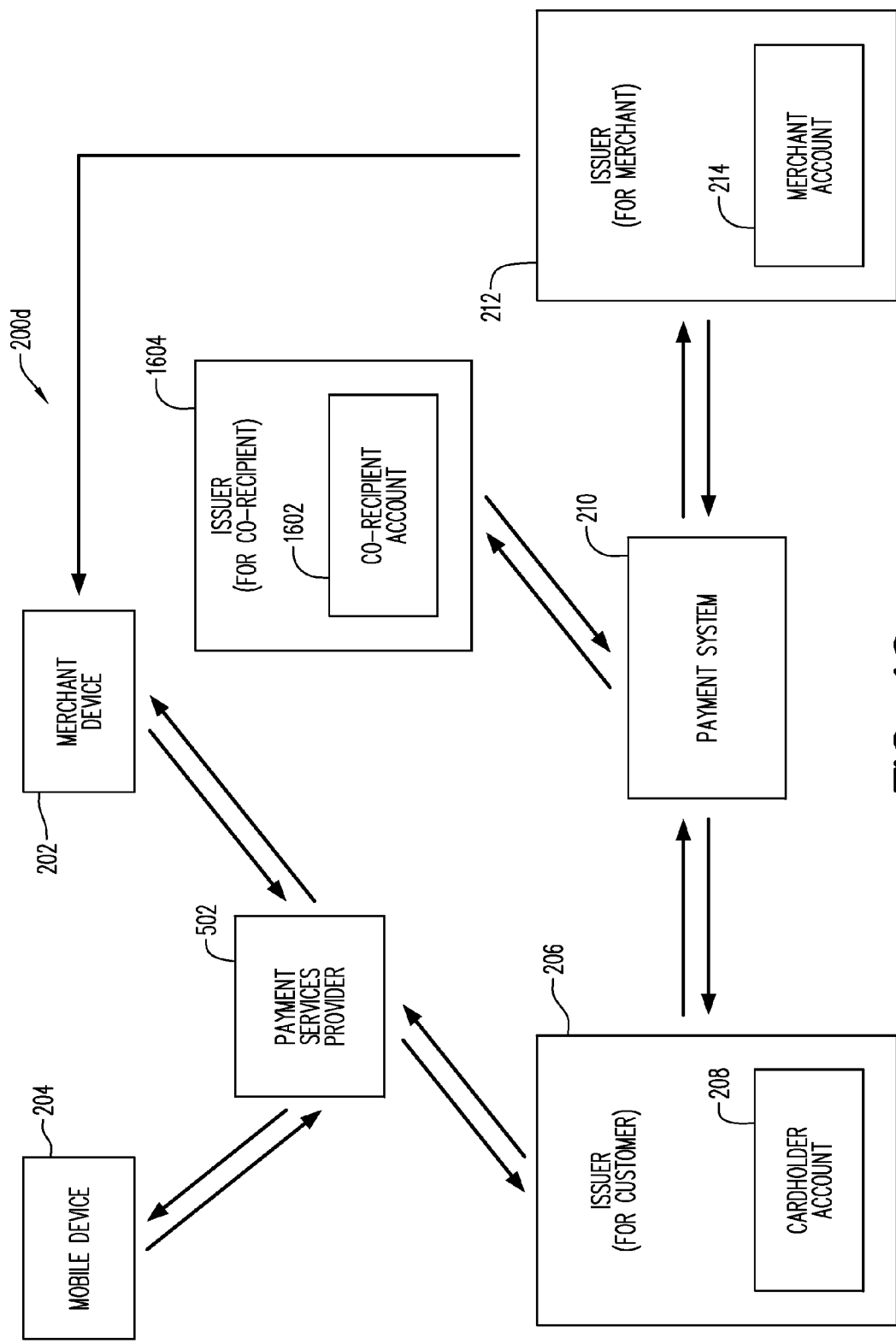
FIG. 16 is a block diagram that illustrates yet another embodiment of a transaction-handling system.

FIG. 16 is a block diagram that illustrates still another embodiment of a transaction-handling system, indicated by reference numeral 200d.

For example, the transaction-handling system 200d of FIG. 16 may have all of the components shown in FIG. 5, including the merchant device 202, the customer's mobile device 204, the payment services provider computer 502, the customer's issuing FI 206 (i.e. the FI which issued the customer's payment card account 208), the payment system 210 and the merchant's issuing FI 212 (i.e., the FI which issued the merchant's payment card account 214). In addition, the system 200d may include another payment card account 1602 (issued by issuing FI 1604), which is to receive a portion of the payment transaction, with the merchant's payment card account 214 receiving the balance of the payment transaction. (Without loss of generality, it may equally be said that the merchant's payment card account 214 receives a portion of the payment transaction, while the other payment card account 1602 receives another portion (or the "balance") of the payment transaction.) The payment card account 1602 may be referred to as a co-recipient's account in the sense that the party to which the payment card account was issued is a co-recipient, with the merchant, designated in the payment transaction. Similarly, the issuing FI 1604 may be referred to as the co-recipient's issuing FI.

One manner in which a split payment transaction takes place may be as follows:

(A) A request for the transaction is received by the payment services provider computer 502 from the customer's mobile device 204, with the request including for example the total amount to be paid and a merchant identifier. In some embodiments, the request may specify that the payment be split and between which recipients. (B) The payment services provider computer 502 may identify the transaction as qualifying for or requiring split payment based on either explicit instructions in the request or one or more rules triggered by characteristics of the transaction. (C) After recognizing that split payment is or may be in order, the payment services provider computer 502 may temporarily suspend the transaction and then may access a database record or other stored information to determine how to divide the payment, and between what destination accounts. (D) To the extent necessary, the payment services provider computer 502 may initiate an authorization request to confirm that sufficient funds are available for the transaction in the customer's payment card account. (E) Next the payment services provider computer 502 may initiate respective payment transactions to implement each partial funding portion of the split payment transaction. (F) Upon receiving confirmation that the payment transactions have completed, the payment services provider computer 502 may initiate a confirmation message to the customer and/or to either or both of the recipients of the payment transactions (or alternatively one or both of the recipients may receive confirmation from the respective issuer for the recipient's payment card account). In the event that one or more of the payment transactions fails (e.g., due to insufficient funds or denial of authorization or unavailability of a recipient account), the payment services provider computer 502 may be guided by stored instructions to take appropriate action.

Clearing and settlement of the constituent payment transactions may be undertaken in normal course and may in effect clear and settle the entire transaction. Split payment transactions may not require any modification of conventional payment transaction practices. Nevertheless, in some embodiments it may be useful to modify some conventional processes or provide new processes to facilitate handling of failed transactions. Such processes may include reversals of payment transactions, and establishment of rules as to the order in which the constituent payment transactions are to be executed.

There will now be discussed specific applications of the concept of splitting a payment transaction between two (or more) recipients.

In one example, the co-recipient is a sales tax collection authority. For example, the payment transaction requested by the customer may call for the pre-tax subtotal amount of a sales transaction to be transferred to the merchant's payment card account 214, with the tax due on the sales transaction to be transferred (in the same or a related payment transaction) to the sales tax collection payment card account (reference numeral 1602, according to this example).

In another example, it is assumed that the customer is purchasing an item (e.g., a piece of furniture) that has been consigned for sale by the merchant. In this case, the co-recipient is the consignor. Thus the consignor's share of the purchase price is transferred to the consignor's payment card account (reference numeral 1602, according to this example) by a purchase transaction requested by the customer, and the balance of the purchase price, which can also be considered the merchant's commission, is transferred to the merchant's payment card account 214 by the same or a related payment transaction requested by the customer.

In yet another example, the "merchant" is assumed to be a construction company/home remodeling company that serves as a general contractor (GC), and the co-recipient may be a subcontractor or supplier of materials to the GC.

In still another example, the "merchant" is assumed to be a part-time domestic employee, and the co-recipient may be the Internal Revenue Service or a state tax authority, acting as collector of payroll withholding taxes or other payroll taxes.

Figure 17:
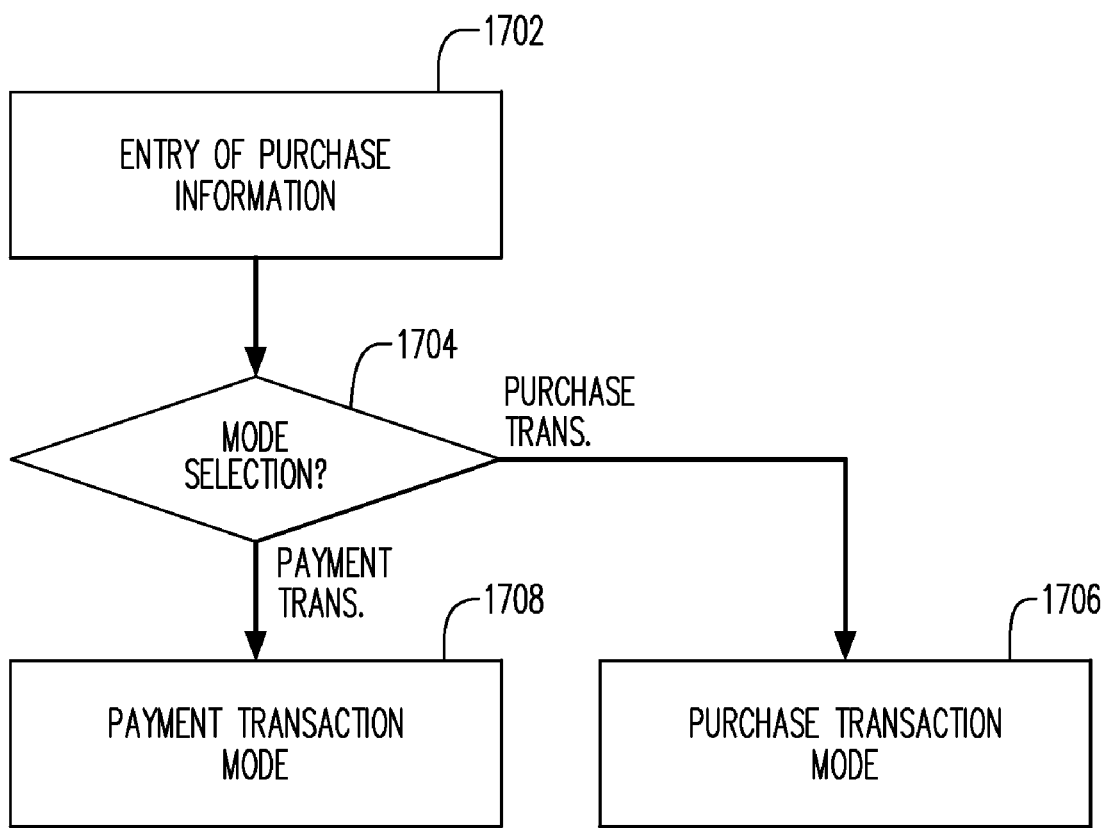
FIG. 17 is a flow chart that illustrates a process that may be performed in a point of sale terminal that may serve as the merchant device shown in FIG. 2.

FIG. 17 is a flow chart that illustrates a process that may be performed in the point of sale terminal 202 that may serve as the merchant device shown in FIG. 2, 5, 6, 15 or 16.

To summarize the import of FIG. 17 before discussing it in detail, in some embodiments the POS terminal 202 may be selectively operable in either a conventional payment card purchase transaction mode (described with reference to FIG. 1) or in a novel mode, as described hereinabove, in which the POS terminal 202 serves as an adjunct to a customer-requested payment card system payment transaction by which the pending sales transaction will be settled. As will be appreciated from the previous discussion (e.g., of FIGS. 2, 5 and 6), in the latter mode, the POS terminal 202 does not initiate a payment card purchase transaction authorization request, but rather only displays or transmits transaction information (to the customer's mobile device 204 or to an intermediary such as payment services provider computer 502) and then awaits confirmation of the effectiveness of the customer-requested payment transaction.

Turning, then to FIG. 17, at 1702, information to define the purchase transaction is entered into the POS terminal 202. This may entail, for example, the barcode reader component 306 (FIG. 3) of the POS terminal 202 being used to read a product identifying barcode or barcodes from one or more items that the customer wishes to purchase.

Next, at 1704 in FIG. 17, the POS terminal determines whether it has been placed in the (conventional) purchase transaction mode or in the (novel) payment transaction mode. If the former mode is selected, the POS terminal operates (step 1706) in the manner described above with reference to FIG. 1. If the latter mode is selected, the POS terminal does not initiate a purchase transaction authorization request, but rather operates (step 1708) as described above in connection with FIG. 8.

Selection between the purchase transaction mode and the payment transaction mode may occur in a number of ways. For example, in some embodiments, the purchase transaction mode may be selected by swiping a magnetic stripe payment card through the magnetic stripe reader component 310 (FIG. 3) of the POS terminal 202 or by bringing a contactless payment card or payment device (including, e.g., a mobile telephone equipped with contactless payment device capabilities) into proximity with the RFID/NFC terminal component 316 of the POS terminal 202. In such embodiments, selection of the payment transaction mode may require positive input from the operator, such as touching a relevant portion of a touch screen, actuating a soft key, or actuating a dedicated function key to indicate selection of the payment transaction mode. In other embodiments, the payment transaction mode may be the default mode of operation for the POS terminal, entered upon initiation of a purchase transaction (e.g., by reading a barcode from a product item), with the purchase transaction mode only being entered upon presentation of a payment card or device to the POS terminal, as described earlier in this paragraph. In still other embodiments, selection of either mode may require positive input from the operator, e.g., by selecting an appropriate option from a menu displayed by the POS terminal.

(The above discussion is not meant to imply the absence of another mode or modes of operation, such as a cash payment mode.)

Departing from the above discussion of dual (or more than dual) use embodiments of the POS terminal 202, it should also be understood that in some embodiments of the merchant device, whether or not it would generally be considered a POS terminal, the device may support only one mode of operation, namely a payment transaction mode as described hereinabove in connection with FIG. 8. Alternatively, the merchant device 202 may support cash transactions in addition to payment-system-based payment transactions as described herein.

In some embodiments, the customer's mobile device 204 may also be a dual use device in terms of its payment capabilities. That is, in some embodiments the customer's mobile device 204 may be selectively operable either in a conventional contactless payment mode (in which the payment card account number is read from an RFID chip (reference numeral 424, FIG. 4) in the device by the POS terminal, which in turn initiates an authorization request for a purchase transaction) or a payment transaction request mode of operation, as described hereinabove in connection with FIG. 9. In some embodiments, the customer may select the former mode simply by bringing the device 204 into proximity with the RFID/NFC reading component of a POS terminal 202. Selection of the latter mode may require positive input from the customer, as by selecting a suitable menu option displayed by the display 402 of the device 204. In other embodiments, the latter mode may be entered semi-automatically, by receiving a message containing the transaction information, where the message is pushed to the device 204 by the merchant device 202 or by the payment service provider computer 502, and the customer then responds affirmatively to the message to initiate the request for the payment transaction.

In other embodiments, selecting either the purchase transaction mode or the payment transaction mode for the customer's mobile device 204 may require the customer to actuate a soft key, a dedicated button, or the like.

In still other embodiments, the customer's mobile device 204 may take its cue, in terms of selecting between the two modes, from a POS terminal 202 to which the mobile device 204 is presented. That is, if the POS terminal 202 is in the purchase transaction mode when the mobile device 204 is presented to the POS terminal's RFID/NFC component, then the purchase transaction mode may be automatically selected for the mobile device 202, such that the mobile device uploads the payment card account number to the POS terminal in a conventional manner in response to a conventional interrogation signal from the RFID/NFC component. However, if the POS terminal is in the payment transaction mode, the POS terminal may respond to the presence of the mobile device at the RFID/NFC component by pushing the transaction information to the mobile device via NFC, and in response to receiving the transaction information the mobile device enters the payment transaction mode.

FIGS. 2, 5, 6, 11, 13, 15 and 16 each depict only system components that may be involved in a single transaction, rather than all of the components that may be present in the system. For example, each system may also include: (a) numerous other customer mobile devices 204 in addition to the one such device shown; (b) numerous other merchant devices 202 in addition to the one such device shown; (c) numerous other payment card account issuers in addition to the two issuing FIs typically shown in the drawings; (d) numerous service providers in addition to the service provider 1104 shown in FIG. 11; (e) numerous other employees and employers besides the single employee and single employer shown in FIG. 13; (f) a considerable number of additional funding sources in addition to the one shown in FIG. 15. Moreover, the various system embodiments shown in the drawings may be combined in various combinations. For example, a single system may be provided which provides most or all of the features described with reference to FIGS. 2, 5, 11, 13, 15 and 16.

In FIGS. 5 and 6, respectively, the confirmation of the payment transaction is shown as flowing from the merchant's issuer to the merchant directly and indirectly via the payment services provider computer 502. Alternatively, however, the confirmation of the payment transaction may flow to the merchant via the payment system 210 and the payment services provider computer 502.

To a large extent, the novel applications of payment transactions as proposed herein have been described in the context of face-to-face retail sales of goods. However, a considerable number of other novel applications of payment transactions are also contemplated. For example (and as briefly indicated above in connection with split payments, FIG. 16), payment transactions may also be requested via a mobile device by a payment card account holder to settle payments for services such as automobile rentals, taxi rides, airline and train fares, personal care services (e.g., hair salon services, manicures, personal training, etc.), health club and gym fees, medical and dental services, dry cleaning, home renovations, cultural and sporting event ticketing, periodical subscriptions, museum entrance fees, etc., etc. It is also not required that the merchant/service provider be face-to-face with the customer. Thus payment transactions may be initiated by the customer to pay for telephone or online orders. For example, in the case where the customer's mobile device is a PDA, the customer may access an online store, which may push the transaction information, upon checkout, to the customer's mobile device (possibly via a PSP computer 502). The customer's mobile device may then request a payment transaction to settle the online purchase. The online store may receive confirmation via its issuing FI that the payment transaction is or will be completed before proceeding to fulfill the customer's order. The above-noted advantage that the customer does not disclose his/her payment card account number to the merchant may be particularly attractive in the case of online purchases. Similarly, confirmed identification of the merchant (as per step 904, FIG. 9) to the customer prior to requesting the payment transaction may also be a very significant, though optional, feature from the customer's point of view.

While many of the above examples of transactions implemented with payment card system payment transactions have related to consumer purchases, similar transactions may occur with respect to business transactions, such as purchases of supplies by businesses using commercial credit or debit cards, or, e.g., a small contractor purchasing building materials with a credit or debit card. Thus a customer, as referred to herein and in the appended claims, need not be an individual consumer.

In cases where there is a payment services provider computer to perform "on behalf" services as in the systems of FIGS. 5 and 6, the payment services provider computer need not necessarily perform all of the services described. For example, in at least some situations, the transaction information may be transmitted from the merchant device to the customer's mobile device, or entered manually into the customer's mobile device, which then sends the payment transaction request to the payment services provider computer for forwarding to the customer's issuing FI.

In addition to other advantages, including those described above, the system architectures shown, e.g., in FIGS. 5 and 6 may also allow the customer's issuing FI to set policies for personalizing and/or customizing service practices, such that, for example: (a) credit offers may be made only to certain customers and/or in connection only with certain kinds of transactions; and (b) whether additional authentication procedures are required may be determined according to predetermined rules on a customer-by-customer and/or on a transaction-by-transaction basis. More complex rules may also determine when authentication is required, including for example rules based on recent transaction history for an account.

It will be understood that communications among the customer's mobile device 204 and/or the merchant device 202 and/or other components in the system may be carried, at least in part, via a conventional mobile telephone network, which is not explicitly shown in the drawings.

In some embodiments, the customer's mobile device triggers the merchant device to download the transaction information to the customer's mobile device by transmitting a suitable signal to the merchant device, e.g., by NFC. Correspondingly, the merchant device may download the transaction information to the customer's mobile device in response to receiving such a signal from the customer's mobile device. Receiving such a signal may place the merchant device in the above-mentioned payment transaction mode of operation.

The flow charts and descriptions thereof herein should not be understood to prescribe a fixed order of performing the method steps described therein. Rather the method steps may be performed in any order that is practicable.

As used herein and in the appended claims, an "information message" includes a text message or any other message sent to or from a mobile device to transmit information other than audible or visual information.

As used herein and in the appended claims, "mobile identifier" refers to a mobile telephone number or any other identification information that uniquely identifies a mobile telephone or other mobile device.

As used herein and in the appended claims, the term "payment card account" includes a credit card account or a deposit account that the account holder may access using a debit card. The term "payment card account number" includes a number that identifies a payment card account or a number carried by a payment card, or a number that is used to identify an account in a payment system that handles debit card and/or credit card transactions or to route a transaction in a payment system that handles debit card and/or credit card transactions. The term "payment card" includes a credit card or a debit card (including a pre-paid debit card). The term "payment card account" also includes an account to which a payment card account number is assigned. Thus a payment card account may include an account to which payment transactions may be routed by a payment system that handles debit card and/or credit card transactions, even if the account in question is not eligible to be charged for purchase transactions or other transactions. A payment card account may also include an account from which payment transactions may be routed by a payment system that handles debit card and/or credit card transactions, even if the account in question is not customarily used, or is not eligible, to be charged for purchase transactions.

The account numbers that identify the merchants' or other recipients' payment card accounts herein may be in a format and in an account number range that allow payment transactions to be routed to the accounts in question; the accounts may, but need not, be operable also for charging purchase transactions to such accounts.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A mobile device, comprising:
  a first antenna;
  at least one control device coupled to the first antenna, the at least one control device operable in a first mode, in which said at least one control device transmits a payment card account number via the first antenna to a point of sale terminal, and in a second mode, in which said at least one control device transmits a message to the point of sale terminal via the first antenna to request that the point of sale terminal download transaction information to the mobile device; and
  a second antenna coupled to the at least one control device;
  wherein, in said second mode, said at least one control device transmits, via said second antenna, a request for a funds transfer, said request for funds transfer including merchant information that identifies a merchant who operates the point of sale terminal, said request for funds transfer being transmitted in said second mode after the mobile device receives said merchant information from said point of sale terminal, said mobile device not transmitting said payment card account number to said point of sale terminal in said second mode.

2. The mobile device of claim 1, wherein:
  the at least one control device includes a first control device coupled to the first antenna, and a second control device coupled to the second antenna, the second control device in communication with the first control device.

3. The mobile device of claim 2, wherein:
  the first control device transmits the payment card account number via the first antenna in the first mode;

the first control device transmits the message to the point of sale terminal via the first antenna in the second mode; and the second control device transmits the request for a funds transfer via the second antenna in the second mode.

4. The mobile device of claim 1, wherein the mobile device transmits the request for funds transfer to a service provider that is different from the merchant.

5. The mobile device of claim 1, wherein the mobile device transmits the request for funds transfer to an issuer of a payment card account identified by the payment card account number.

6. A mobile device, comprising:

a first antenna;

at least one control device coupled to the first antenna, the at least one control device selectively operable in a first mode, in which said at least one control device transmits a payment card account number via the first antenna to a point of sale terminal, and in a second mode, in which said at least one control device receives, via the first antenna, transaction information downloaded from the point of sale terminal; and a second antenna coupled to the at least one control device;

wherein, in said second mode, said at least one control device transmits, via said second antenna, a request for a funds transfer, said request for funds transfer including merchant information that identifies a merchant who operates the point of sale terminal, said request for funds transfer being transmitted in said second mode after the mobile device receives said merchant information from said point of sale terminal, said mobile device not transmitting said payment card account number to said point of sale terminal in said second mode.

7. The mobile device of claim 6, wherein said request for a funds transfer includes the currency amount and the information that identifies the merchant.

8. The mobile device of claim 6, wherein:

the at least one control device includes a first control device coupled to the first antenna, and a second control device coupled to the second antenna, the second control device in communication with the first control device.

9. The mobile device of claim 6, wherein:

the at least one control device is placed in said first mode by being brought into proximity to a proximity reader that is associated with the point of sale terminal; and the at least one control device is placed in said second mode by a user actuating a switch on the mobile device.

10. The mobile device of claim 6, wherein the at least one control device is placed in said second mode in response to a signal received from the point of sale terminal.

11. The mobile device of claim 6, wherein the mobile device transmits the request for funds transfer to a service provider that is different from the merchant.

12. The mobile device of claim 6, wherein the mobile device transmits the request for funds transfer to an issuer of a payment card account identified by the payment card account number.

13. A mobile device comprising:

a first antenna;

a second antenna; and at least one control device coupled to the first and second antennas, the at least one control device selectively operable in a first mode, in which said at least one control device transmits a payment card account number via the first antenna to a point of sale terminal, and in a second mode, in which the at least one control device receives transaction information via the second antenna;

wherein:

the transaction information includes a currency amount and merchant information that identifies a merchant who operates the point of sale terminal; and in said second mode, said at least one control device transmits, via said second antenna, a request for a funds transfer, said request for funds transfer including said merchant information, said request for funds transfer being transmitted in said second mode after the mobile device receives said merchant information from said point of sale terminal, said mobile device not transmitting said payment card account number to said point of sale terminal in said second mode.

14. The mobile device of claim 13, wherein said request for a funds transfer includes the currency amount and the information that identifies the merchant.

15. The mobile device of claim 13, wherein the mobile device transmits the request for funds transfer to a service provider that is different from the merchant.

16. The mobile device of claim 13, wherein the mobile device transmits the request for funds transfer to an issuer of a payment card account identified by the payment card account number.

* * * * *